United States Patent
Li et al.

(10) Patent No.: US 11,808,907 B2
(45) Date of Patent: *Nov. 7, 2023

(54) USE NUOS TECHNOLOGY TO ACQUIRE OPTIMIZED 2D DATA

(71) Applicant: SHEARWATER GEOSERVICES SOFTWARE INC., Houston, TX (US)

(72) Inventors: Chengbo Li, Houston, TX (US); Charles C. Mosher, Houston, TX (US); Robert G. Keys, Houston, TX (US); Peter M. Eick, Houston, TX (US); Sam T. Kaplan, Houston, TX (US); Joel D. Brewer, Sealy, TX (US)

(73) Assignee: SHEARWATER GEOSERVICES SOFTWARE INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,114

(22) Filed: Jun. 14, 2021

(65) Prior Publication Data
US 2021/0311219 A1    Oct. 7, 2021

Related U.S. Application Data

(63) Continuation of application No. 15/801,793, filed on Nov. 2, 2017, now Pat. No. 11,035,968.
(Continued)

(51) Int. Cl.
*G01V 1/38*        (2006.01)
*G01V 1/28*        (2006.01)
(Continued)

(52) U.S. Cl.
CPC ............ *G01V 1/3808* (2013.01); *G01V 1/137* (2013.01); *G01V 1/282* (2013.01); *G01V 1/36* (2013.01); *G01V 2210/57* (2013.01)

(58) Field of Classification Search
CPC ...... G01V 1/3808; G01V 1/137; G01V 1/282; G01V 1/36; G01V 2210/57; G01V 2210/1212; G01V 2210/1293
(Continued)

(56) References Cited

U.S. PATENT DOCUMENTS 3,840,845 A    10/1974  Brown
4,404,664 A     9/1983  Zachariadis
(Continued)

FOREIGN PATENT DOCUMENTS

WO    WO-2013105075 A1    7/2013
WO    WO-2016009270 A1    1/2016

OTHER PUBLICATIONS

Baraniuk R.G., "Compressive Sensing," IEEE Signal Processing Magazine, Jul. 2007, vol. 24(4), 9 pages.
(Continued)

*Primary Examiner* — Daniel L Murphy
(74) *Attorney, Agent, or Firm* — Polsinelli PC

(57) ABSTRACT

A method for 2D seismic data acquisition includes determining source-point seismic survey positions for a combined deep profile seismic data acquisition with a shallow profile seismic data acquisition wherein the source-point positions are based on non-uniform optimal sampling. A seismic data set is acquired with a first set of air-guns optimized for a deep-data seismic profile and the data set is acquired with a second set of air-guns optimized for a shallow-data seismic profile. The data are de-blended to obtain a deep 2D seismic dataset and a shallow 2D seismic dataset.

20 Claims, 16 Drawing Sheets

Related U.S. Application Data

(60) Provisional application No. 62/416,571, filed on Nov. 2, 2016.

(51) Int. Cl.
 *G01V 1/36* (2006.01)
 *G01V 1/137* (2006.01)

(58) Field of Classification Search
 USPC .......................................................... 367/21
 See application file for complete search history.

(56) References Cited

U.S. PATENT DOCUMENTS

| | | | |
|---|---|---|---|
| 4,721,180 | A | 1/1988 | Haughland et al. |
| 4,852,004 | A | 7/1989 | Manin |
| 5,148,406 | A | 9/1992 | Brink et al. |
| 5,353,223 | A | 10/1994 | Norton et al. |
| 5,469,404 | A | 11/1995 | Barber et al. |
| 5,973,995 | A | 10/1999 | Walker et al. |
| 6,691,038 | B2 | 2/2004 | Zajac |
| 7,167,412 | B2 | 1/2007 | Tenghamn |
| 2009/0073805 | A1 | 3/2009 | Tulett et al. |
| 2010/0002536 | A1 | 1/2010 | Brewer et al. |
| 2013/0135966 | A1 | 5/2013 | Rommel et al. |
| 2015/0124560 | A1 | 5/2015 | Li et al. |
| 2016/0131785 | A1 | 5/2016 | Tonchia |
| 2016/0223696 | A1 * | 8/2016 | Josse .................. G01V 1/3808 |

OTHER PUBLICATIONS

Hennenfent G., et al., "Simply Denoise: Wavefield Reconstruction via Jittered undersampling," Geophysics, May-Jun. 2008, vol. 73(3), pp. V19-V28.

Herrmann F.J., "Randomized Sampling and Sparsity: Getting More Information from Fewer Samples," Geophysics, vol. 75(6), Nov.-Dec. 2010, pp. WB173-WB187.

International Search Report for Application No. PCT/US2017/59760, dated Apr. 13, 2018, 2 pages.

Kumar R., et al., "Source Separation for Simultaneous Ttowed-Streamer Marine Acquisition—A Compressed Sensing Approach," Geophysics, vol. 80(6), Nov.-Dec. 2015, pp. WD73-WD88.

Liu B., et al., "Minimum Weighted Norm Interpolation of Seismic Records," Geophysics, Nov.-Dec. 2004, vol. 69(6), pp. 1560-1568.

Mahdad A., et al., "Separation of Blended Data by Iterative Estimation and Subtraction of Blending Interference Noise," Geophysics, vol. 76(3), May-Jun. 2011, pp. Q9-Q17.

Maurer H., et al., "Recent advances in optimized geophysical survey design," Seismic Data Acquisition, Geophysics, Sep.-Oct. 2010, vol. 75(5), SEG Press Book, pp. 75A177-75A194.

Meunier J., "Seismic Acquisition from Yesterday to Tomorrow," SEG/EAGE Distinguished Instructor Series, 2011, No. 14, 250 pages.

Milton A., et al., "Reducing Acquisition Costs with Random Sampling and Multidimensional Interpolation," SEG San Antonio 2011 Annual Meeting, 2011, pp. 52-56.

Moldoveanu N., "Random Sampling: A New Strategy for Marine Acquisition," SEG Expanded Abstracts, Denver, CO, 2010 Annual Meeting, 2010, pp. 51-55.

Mosher C.C., et al., "An In-situ Analysis of 3-D Seismic Lateral Resolution," Borehole Geophysics, BHG 6.3, 1985, pp. 109-111.

Mosher C.C., et al., "Compressive Seismic Imaging," SEG Las Vegas 2012 Annual Meeting, 2012, DOI http://dx.doi.org/10.1190/segam2012-1460.1, 5 pages.

Mosher C.C., et al., "Non-Uniform Optimal Sampling for Seismic Survey Design," 74th EAGE Conference and Exhibition, Extended Abstracts, X034, Copenhagen, Denmark, Jun. 4-7, 2012, 5 pages.

Mosher C.C., et al., "Non-Uniform Optimal Sampling for Simultaneous Source Survey Design," SEG Annual Meeting, 2014, pp. 105-109.

Naghizadeh M., et al., "Multistep Autoregressive Reconstruction of Seismic Records," MSAR Reconstruction, Geophysics, 2007, vol. 72(6), 19 pages.

Sacchi M.D., "A Tour of High Resolution Transforms," Frontiers & Innovation, CSPG, CSEG, CWLS Convention, Calgary, Alberta, Canada, Expanded Abstracts, 2009, pp. 665-668.

Shapiro H.S., et al., "Alias-Free Sampling of Random Noise," SIAM Journal on Applied Mathematics, 1960, vol. 8(2), pp. 225-248.

Trad D., "Interpolation and Multiple Attenuation with Migration Operators," Geophysics, vol. 68(6), Nov.-Dec. 2003, pp. 2043-2054.

Written Opinion for International Application No. PCT/US2017/59760, dated Apr. 13, 2018, 4 pages.

Xu F., et al., "Evaluation of in Situ Sea Surface Temperatures for Use in the Calibration and Validation of Satellite Retrievals," Journal of Geophysical Research, 2010, vol. 115, C09022, 18 pages.

\* cited by examiner

USE NUOS TECHNOLOGY TO ACQUIRE OPTIMIZED 2D DATA

CROSS-REFERENCE TO RELATED APPLICATIONS

The present application is a continuation of U.S. patent application Ser. No. 15/801,793, filed on Nov. 2, 2017 and entitled "USE NUOS TECHNOLOGY TO ACQUIRE OPTIMIZED 2D DATA," which claims benefit under 35 USC § 119(e) to U.S. Provisional Application No. 62/416,571 filed Nov. 2, 2016, entitled, "USE NUOS TECHNOLOGY TO ACQUIRE OPTIMIZED 2D DATA." Each of these application is incorporated by reference herein in its entirety.

FIELD

The present technology relates generally to seismic imaging. More particularly, but not by way of limitation, implementations of the present technology include tools and methods for acquiring and processing seismic data using compressive sensing with optimized source and sensor sampling.

BACKGROUND

Seismic imaging typically involves not only acquiring seismic data but processing the acquired seismic data. In some cases, processing requires recovering missing pieces of information from irregularly acquired seismic data. Irregularities may be caused by, for example, dead or severely corrupted seismic traces, surface obstacles, acquisition apertures, economic limits, and the like. Certain seismic processing techniques may be employed to spatially transform irregularly acquired seismic data to regularly sampled data that is easier to interpret. This regularization can involve a number of processing techniques such as interpolation and reconstruction of seismic data.

In recent years, compressive sensing theories have gained traction. One application of compressive sensing in geophysics involves seismic data reconstruction (e.g., Hennenfent and Herrmann, 2008). As an overview, compressive sensing provides conditions for when an under-determined system of equations has a desirable solution. A seismic data reconstruction problem (e.g. Stolt, 2002; Trad, 2003; Liu and Sacchi, 2004; Abma and Kabir, 2006; Ramirez et al., 2006; Naghizadeh and Sacchi, 2007; Xu et al., 2010; Kaplan et al., 2010) provides a coarse set of observed traces along with a desired set of fine spatial grid points upon which data is reconstructed. Compressive sensing theory can address such issues as 1) how many observations need to be collected, 2) where the observations should be made (i.e., sampling grid) with respect to the reconstruction grid, and 3) what mathematical dictionary (e.g., mutual coherence) should be used to represent the reconstructed data. While mutual coherence is an important metric in compressive sensing theory, it can also be expensive to compute. Descriptions and/or overviews of seismic data reconstruction can also be found in Trad, 2003; Liu and Sacchi, 2004; Abma and Kabir, 2006; Naghizadeh and Sacchi, 2007; Xu et al., 2010, which are hereby incorporated by reference, hereafter.

Certain data reconstruction techniques have been developed, which provide a sparse representation of reconstructed data. For example, Liu and Sacchi (2004) promote a sparse solution in wave-number domain using a penalty function constructed from inverse power spectrum of the reconstructed data. In compressive sensing, it is common to apply an $l_1$ norm to promote some sparse representation of the reconstructed data. The $l_1$ norm has become of particular interest due to its relation to the $l_0$ norm which is a count of the number of non-zero elements. Theorems provide conditions for exact recovery of the reconstructed data and which, in part, rely on relationship between the $l_1$ and $l_0$ norms, and use of the $l_1$ norm in a convex optimization model (Candes et al., 2006). At least one theory of compressive sensing indicates that a sparse or compressible signal can be recovered from a small number of random linear measurements by solving a convex $l_1$ optimization problem (e.g. Baraniuk, 2007).

Compressive sensing can also provide new opportunities for survey design using an irregular sampling grid (e.g. Hennenfent and Herrmann, 2008; Kaplan et al., 2012) instead of a traditional regular grid in order to increase bandwidth and reduce cost. Generally, irregular survey design based on compressive sensing can be summarized by the following steps: 1) determine a nominal regular grid for survey area, 2) choose a subset of locations from this nominal grid in a random or randomly jittered (Hennenfent and Herrmann, 2008) fashion, 3) acquire seismic data based on chosen locations, and 4) reconstruct the data back to the original nominal grid. This approach is applicable to both shot and receiver dimensions.

In certain cases, compressive sensing using irregular acquisition grids can be used to recover significantly broader spatial bandwidth than could be obtained using a regular sampling grid. Recovered bandwidth is primarily determined according to the spacing of nominal grid for reconstruction. If a predefined nominal grid is too coarse, the reconstructed seismic data may still be aliased; if the predefined nominal grid is too fine, the time and cost savings of irregular versus regular survey design may become insignificant. In general, if there is a lack of prior information about a given survey area, then it may not be feasible to select a proper nominal grid beforehand.

BRIEF SUMMARY OF THE DISCLOSURE

The present technology relates generally to seismic imaging. More particularly, but not by way of limitation, implementations of the present technology include tools and methods for processing seismic data by compressive sensing and non-uniform optimal sampling.

Compressive sensing theory is utilized for seismic data reconstruction. Compressive sensing, in part, requires an optimization model. Two classes of optimization models, synthesis- and analysis-based optimization models, are considered. For the analysis-based optimization model, a novel optimization algorithm (SeisADM) is presented. SeisADM adapts the alternating direction method with a variable-splitting technique, taking advantage of the structure intrinsic to the seismic data reconstruction problem to help give an efficient and robust algorithm. SeisADM is demonstrated to solve a seismic data reconstruction problem for both synthetic and real data examples. In both cases, the SeisADM results are compared to those obtained from using a synthesis-based optimization model. Spectral Projected Gradient L1 solver (SPGL1) method can be used to compute the synthesis-based results. Through both examples, it is observed that data reconstruction results based on the analysis-based optimization model are generally more accurate than the results based on the synthesis-based optimization model. In addition, for seismic data reconstruction, the SeisADM method requires less computation time than the SPGL1 method.

Compressive sensing can be successfully applied to seismic data reconstruction to provide a powerful tool that reduces the acquisition cost and allows for the exploration of new seismic acquisition designs. Most seismic data reconstruction methods require a predefined nominal grid for reconstruction, and the seismic survey must contain observations that fall on the corresponding nominal grid points. However, the optimal nominal grid depends on many factors, such as bandwidth of the seismic data, geology of the survey area, and noise level of the acquired data. It is understandably difficult to design an optimal nominal grid when sufficient prior information is not available. In addition, it may be that the acquired data contain positioning errors with respect to the planned nominal grid. An interpolated compressive sensing method is presented which is capable of reconstructing the observed data on an irregular grid to any specified nominal grid, provided that the principles of compressive sensing are satisfied. The interpolated compressive sensing method provides an improved data reconstruction compared to results obtained from some conventional compressive sensing methods.

Compressive sensing is utilized for seismic data reconstruction and acquisition design. Compressive sensing theory provides conditions for when seismic data reconstruction can be expected to be successful. Namely, that the cardinality of reconstructed data is small under some, possibly over-complete, dictionary; that the number of observed traces are sufficient; and that the locations of the observed traces relative to that of the reconstructed traces (i.e. the sampling grid) are suitably chosen. If the number of observed traces and the choice of dictionary are fixed, then choosing an optimal sampling grid increases the chance of a successful data reconstruction. To that end, a mutual coherence proxy is considered which is used to measure how optimal a sampling grid is. In general, the computation of mutual coherence is prohibitively expensive, but one can take advantage of the characteristics of the seismic data reconstruction problem so that it is computed efficiently. The derived result is exact when the dictionary is the discrete Fourier transform matrix, but otherwise the result is a proxy for mutual coherence. The mutual coherence proxy in a randomized greedy optimization algorithm is used to find an optimal sampling grid and show results that validate the use of the proxy using both synthetic and real data examples.

One example of a computer-implemented method for determining optimal sampling grid during seismic data reconstruction includes: a) constructing an optimization model, via a computing processor, given by $\min_u \|Su\|_1$ s.t.$\|Ru-b\|_2 \leq \sigma$ wherein S is a discrete transform matrix, b is seismic data on an observed grid, u is seismic data on a reconstruction grid, and matrix R is a sampling operator; b) defining mutual coherence as $$\mu \leq \sqrt{\frac{C}{S} \frac{m}{(\log n)^6}},$$

wherein C is a constant, S is a cardinality of Su, m is proportional to number of seismic traces on the observed grid, and n is proportional to number of seismic traces on the reconstruction grid; c) deriving a mutual coherence proxy, wherein the mutual coherence proxy is a proxy for mutual coherence when S is over-complete and wherein the mutual coherence proxy is exactly the mutual coherence when S is a Fourier transform; and d) determining a sample grid r=arg $\min_r \mu(r)$.

In one nonlimiting implementation a method for 2D seismic data acquisition includes determining source-point seismic survey positions for a combined deep profile seismic data acquisition with a shallow profile seismic data acquisition wherein the source-point positions are based on non-uniform optimal sampling. A seismic data set is acquired with a first set of air-guns optimized for a deep-data seismic profile and the data set is acquired with a second set of air-guns optimized for a shallow-data seismic profile. The data are de-blended to obtain a deep 2D seismic dataset and a shallow 2D seismic dataset.

The method may further comprise using interpolated compressive sensing to reconstruct the acquired dataset to a nominal grid. Additionally, the method may provide source-point positions based on non-uniform optimal sampling acquired using a Monte Carlo Optimization scheme to determine source-point seismic survey positions.

The method of using a Monte Carlo Optimization scheme may further comprise a Signal-to-Noise Ratio cost-function (SNR cost-function) defined as the root-mean-square SNR of the data to be reconstructed minus the SNR of an elastic wave synthetic dataset over an area of interest using an appropriate velocity model.

The method of using a Monte Carlo Optimization scheme may further determine the non-uniform optimal sampling using a Monte Carlo Optimization scheme comprises a cost-function to determine the optimized locations, the cost function selected from the group consisting of: i) diagonal dominance, ii) a conventional array response, iii) a condition number, iv) eigenvalue determination, v) mutual coherence, vi) trace fold, or vii) azimuth distribution. In other implementations, the nominal grid may be a uniformly sampled grid. The method may further comprise reconstructing the acquired data to obtain one or more receiver gathers.

In another nonlimiting implementation, the first set of air-guns has a first encoded source signature and the second set of air-guns has a second encoded source signature.

In still another nonlimiting implementation, determining the optimized source-point positions is based on non-uniform optimal sampling which further comprises determining an underlying uniformly sampled grid.

BRIEF DESCRIPTION OF THE DRAWINGS

A more complete understanding of the present technology and benefits thereof may be acquired by referring to the follow description taken in conjunction with the accompanying drawings in which.

DETAILED DESCRIPTION

Figure 1:
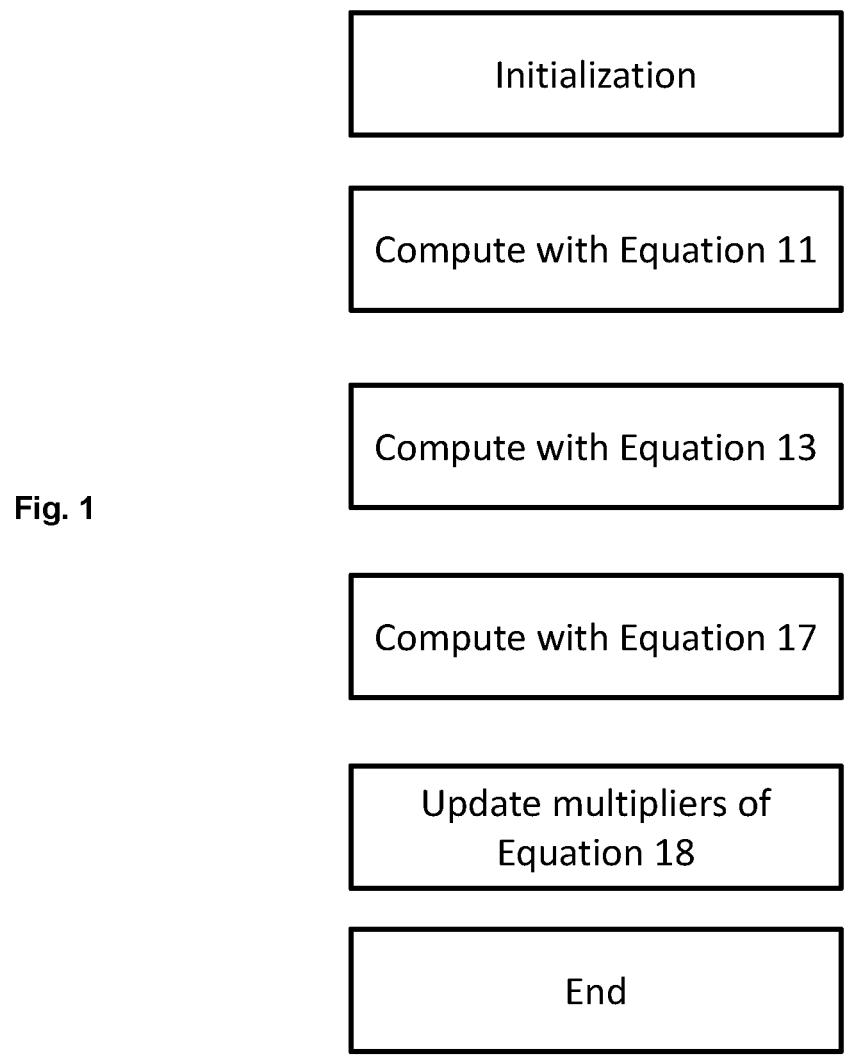
FIG. 1 illustrates an algorithm as described in Example 1.

Reference will now be made in detail to implementations of the presently disclosed technology, one or more examples of which are illustrated in the accompanying drawings. Each example is provided by way of explanation and is intended to be non-limiting. It will be apparent to those skilled in the art that various modifications and variations can be made without departing from the scope or spirit of the presently disclosed technology. For instance, features illustrated or described as part of one implementation can be used on another implementation to yield a still further implementation. Thus, it is intended that the present disclosure cover such modifications and variations that come within the scope of the presently disclosed technology.

Some implementations of the present technology provide tools and methods for reconstructing seismic data utilizing compressive sensing. Convex optimization models used for reconstructing seismic data can fall under at least two categories: synthesis-based convex optimization model and analysis-based convex optimization model (Candes et al., 2008). As used herein, the term "convex optimization problem" and its related terms such as "convex optimization model" generally refer to a mathematical programming problem of finding solutions when confronted with conflicting requirements (i.e., optimizing convex functions over convex sets).

Some implementations of the present technology provides tools and methods for optimizing the analysis-based convex optimization model. At least one implementation adapts an alternating direction method (Yang and Zhang, 2011) with a variable-splitting technique (Wang et al., 2008; Li, 2011). This allows a user to take advantage of the structure in the seismic data reconstruction problem to provide a more efficient solution. Other advantages will be apparent from the disclosure herein.

According to one or more implementations of the present technology, a two-dimensional windowed Fourier transform representation of the data (e.g. Mallat, 2009) may be provided. In some implementations, an irregular acquisition grid may be provided, which is an additional condition for exact recovery given by compressive sensing theory. The irregularity in seismic data can be quantified by mutual coherence which is a function of the irregular acquisition grid and windowed Fourier transform basis (e.g. Elad et al., 2007).

Some implementations provide tools and methods for interpolated compressive sensing data reconstruction for recovering seismic data to a regular nominal grid that is independent of the observed trace locations. Advantages include, but are not limited to, 1) one can try distinct nominal grids for data reconstruction after acquisition, and 2) positioning errors occurring during acquisition can be taken into account. Other geophysical methods for seismic data reconstruction can rely on the discrete Fourier transform to allow for the arbitrary relation between observed trace locations and the nominal grid. By contrast, in the present technology, the transform (Fourier or otherwise) is applied to the nominal grid, and the burden of the mismatch between observed trace locations and the nominal grid is shifted to a restriction/sampling operator.

Some implementations provide tools and methods that derive a mutual coherence proxy applicable to the seismic data reconstruction problem. At least one advantage is that this proxy is efficient to compute. More particularly, it is the maximum non-d.c. component of the Fourier transform of the sampling grid. A greedy optimization algorithm (e.g. Tropp, 2004) is used to find an optimal sampling grid, with the mutual coherence proxy giving data independent measure for optimal. The optimization problem is typically non-convex, and so the greedy algorithm finds a locally optimal solution that depends on how the algorithm is initialized.

Example 1

Data Reconstruction Model

For data reconstruction, a system is defined, wherein (Herrmann, 2010), $$b = RS^*x, x = Su, \qquad (1)$$

where b is observed seismic data, and u is reconstructed seismic data. Matrix R is a restriction (i.e. sampling) operator, mapping from the reconstructed seismic data to the observed seismic data. If S is an appropriately chosen dictionary, then x is a sparse representation of u. For most over-complete dictionaries, such as a wavelet, curvelet and windowed Fourier transforms, $$S^*S = I \qquad (2)$$

Optimization Models

Given the over-complete linear system in equation 1, and observed data b, solution(s) to the reconstructed data u are computed. A frequently used approach from compressive sensing is to solve either basis pursuit (BP) optimization model for noise-free observed data, $$\min_x \|x\|_1 \text{ s.t. } RS^*x = b \qquad (3)$$

or the basis pursuit de-noising (BPDN) optimization model for noisy or imperfect observed data, $$\min_x \|x\|_1 \text{ s.t. } \|RS^*x - b\|_x^2 \leq \sigma \qquad (4)$$

where $\sigma$ is a representative of the noise level in the observed data. For example, if $\tilde{x}$ is the solution to the optimization model in equation 3, then $$\tilde{u} = S^*\tilde{x} \qquad (5)$$

are reconstructed data. In solving either the BP or BPDN model, an assumption may be made that the reconstructed data u have a sparse representation under the dictionary S. Solving the optimization models in equations 3 and 4 is often referred to as synthesis-based $l_1$ recovery (Candes et al., 2008). SPGL1, as proposed by van den Berg and Friendlander (2008), and based on an analysis of the Pareto curve, is one of the most efficient of these methods.

An alternative to the synthesis-based optimization models are analysis-based optimization models for both the noise-free case, $$\min_u \|Su\|_1 \text{ s.t. } Ru = b \qquad (6)$$

and the noisy case, $$\min_b \|Su\|_1 \text{ s.t. } \|Ru - b\|_2 \leq \sigma \qquad (7)$$

Solving the optimization models in equations 6 and 7 is called analysis-based $l_3$ recovery (Candes et al., 2008). When the dictionary S is orthonormal, synthesis- and analysis-based models are theoretically equivalent. However, according to Candes et al. (2008), when S is overcomplete analysis based optimization models involve fewer unknowns and are computationally easier to solve than their synthesis-based counter-parts. Additionally, analysis-based reconstruction may give more accurate solutions than those obtained from synthesis-based reconstruction (Elad et al., 2007).

Alternating Direction Algorithm with Variable Splitting

The SeisADM algorithm performs analysis-based $l_1$ recovery based on the optimization model in equation 7. SeisADM is based on the alternating direction method (e.g. Gabay and Mercier, 1976; Glowinski, 1984; Yang and Zhang, 2011). The alternating direction method (ADM) has been widely used to solve inverse problems. It is known as a robust and stable iterative algorithm, but is usually very costly due to its estimation of the gradient for each iteration. Here, a variable splitting technique in combination with ADM is introduced, which utilizes the structure of the seismic data reconstruction model to find an efficient method for solving the optimization model in equation 7. In particular, the fact that S*S=I, and that R*R is a diagonal matrix are utilized. A similar algorithm can be derived for the noise-free case (equation 6) as well.

Starting from equation 7, splitting variables w=Su is introduced to separate the operator S from the non-differentiable $l_1$ norm, and v=Ru−b to form a $l_2$-ball constrained optimization problem (we only need to introduce one splitting variable w to solve the noise-free model (equation 6)). Therefore, equation 7 is equivalent to, $$\min_{u,w,v} \|w\|_1 \text{ s.t. } w=Su, v+b=Ru, \|v\|_2 \leq \sigma \quad (8)$$

Ignoring the $l_2$-ball constraint ($\|v\|_2 \leq \sigma$), equation 8 has the corresponding augmented Lagrangian function (Gabay and Mercier, 1976), $$L_a(w, u, y)\|w\|_1 - \gamma^*(Su - w) + \frac{\beta}{2}\|Su - w\|_2^2 - \lambda^*(Ru - b - v) + \frac{\mu}{z}\|Ru - b - v\|_2^2 \quad (9)$$

where $\gamma$ and $\lambda$ are Lagrange multipliers, and $\beta$ and $\mu$ are scalars. SeisADM finds the minimum of the equivalent model in equation 8. It does so by minimizing the augmented Lagrangian function in equation 9 with respect to, separately, w, u and v, and then updating the Lagrange multipliers, $\gamma$ and $\mu$.

For constant u and v, the w-subproblem is, $$\min_w \left\{ \|w_1\| - \gamma^*(Su - w) + \frac{\beta}{2}\|Su - w\|_2^2 \right\} \quad (10)$$

Equation 10 is separable with respect to each $w_i \in v$ and has the closed-form solution (e.g. Li, 2011), $$\tilde{w} = \max\left\{ \left\|Su - \frac{\gamma}{\beta}\right\|_1 - \frac{1}{\beta}, 0 \right\} \text{sgn}\left(Su - \frac{\gamma}{\beta}\right) \quad (11)$$

where sgn (x) is 1 for x>0, 0 for x=0, and −1 for x<0.

For constant w and v, the u-subproblem is, $$\min_u \left\{ -\gamma^*(Su - w) + \frac{\beta}{2}\|Su - w\|_2^2 - \lambda^*(Ru - b - v) + \frac{\mu}{z}\|Ru - b - v\|_2^2 \right\} \quad (12)$$

Equation 12 is quadratic, with the corresponding normal equations, $$(\beta S^*S + \mu R^*R)\tilde{u} = S^*(\beta w + \gamma) + R^*(\mu b + \mu v + \lambda). \quad (13)$$

Since S*S=I and R*R is a diagonal matrix, one can explicitly and efficiently solve equation 13.

For constant w and u, the v-subproblem is, $$\min_v \left\{ -\lambda^*(Ru - b - v) + \frac{\mu}{2}\|Ru - b - v\|_2^2 \text{ s.t. } \|v\|_2 < \sigma \right\} \quad (14)$$

The value of v found from solving equation 14 is equivalent to that found from solving, $$\min_v = \left\| \left(Ru - b - v - \frac{\lambda}{\mu}\right) \right\|_2^2 \text{ s.t. } \|v\|_2 \leq \sigma \quad (15)$$

Further, if $$\theta = Ru - b - \frac{\lambda}{\mu}$$

then it can be shown that the explicit solution of equation 15 is, $$\tilde{v} = \begin{cases} \theta, & \text{if } \|\theta\|_2 \leq \sigma \\ \sigma\frac{\theta}{\|\theta\|_2}, & \text{otherwise} \end{cases} \quad (16)$$

The SeisADM algorithm is iterative, where for each iteration $\gamma$ and $\lambda$ are held constant, and the minimum ($\tilde{u}$, $\tilde{v}$, $\tilde{w}$) of the three sub-problems described above are found. At the end of each iteration, the Lagrange multipliers (Glowinski, 1984) is updated, $$\begin{cases} \tilde{\gamma} = \gamma - \xi\beta(Su - w) \\ \tilde{\lambda} = \lambda - \xi\mu(Ru - b - v) \end{cases} \quad (17)$$

Provided that $$0 < \xi < \frac{1 + \sqrt{5}}{2};$$

the theoretical convergence of ADM can be guaranteed. Putting all the components together, our algorithm for solving the analysis-based denoising model (equation 7) is summarized in FIG. 1.

Numerical Results

Two tests are performed and reported in this section to demonstrate the analysis-based $l_1$ recovery and efficiency of SeisADM. Specifically, SeisADM is compared with SPGL1. In an effort to make comparisons fair, an effort can be made to optimally tune parameters for both SeisADM and SPGL1.

Synthetic Data Example

For a synthetic example, data were generated from the Sigsbee 2a model (Bergsma 2001), and a two-dimensional acoustic finite difference simulation. In addition, the data were corrupted with random Gaussian noise, such that the data have a signal to noise ratio of 12.7 dB. A single shot gather is reconstructed to where a set of observed receivers are reconstructed to a regular grid with 1300 receivers with 7:62 m between adjacent receivers. In running 111 data reconstruction simulations, for each simulation the size of the set of observed traces changed, ranging from 8% to 50% of the total number of reconstructed traces.

Figure 2:
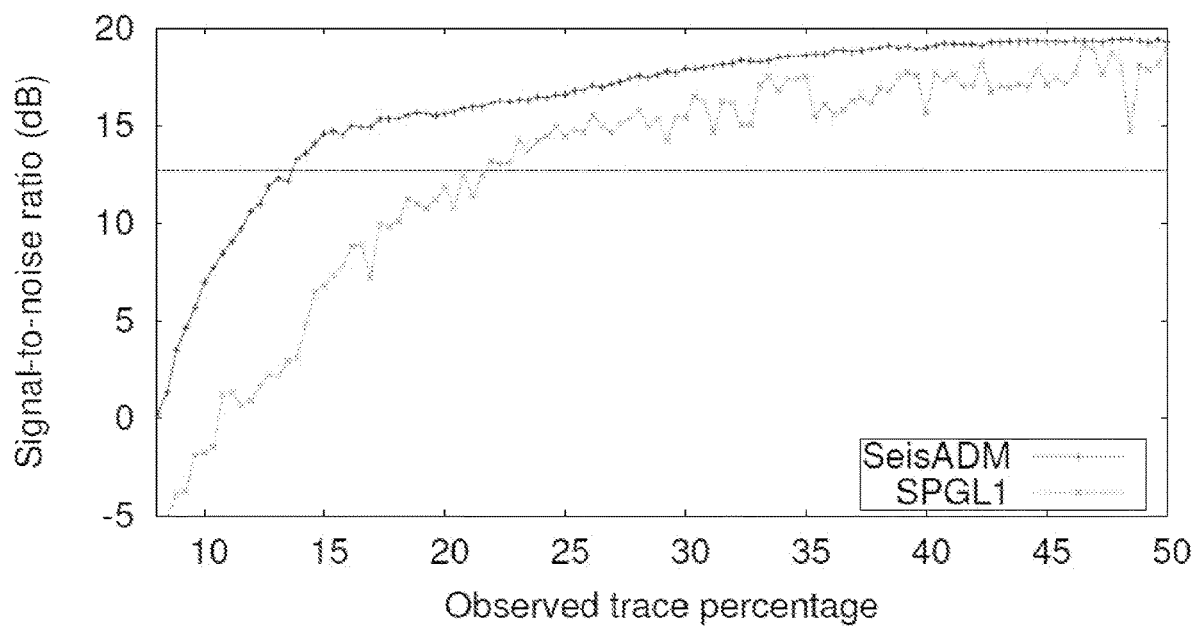
FIG. 2 illustrates a plot as described in Example 1.

The results are shown in FIG. 2 which plots the signal to-noise ratio as a function of the percentage of reconstructed traces that are in the observation set. Results for both synthesis-based $l_1$ recovery (using SPGL1), and analysis based $l_1$ recovery (using SeisADM) are shown. In addition, the horizontal line in FIG. 2 is the signal-to-noise ratio in the original data. The signal-to-noise ratio values in FIG. 2 are computed as a function of the reconstructed and noise-free data, and where the noise-free data are produced from the finite difference simulation.

Figure 3A:
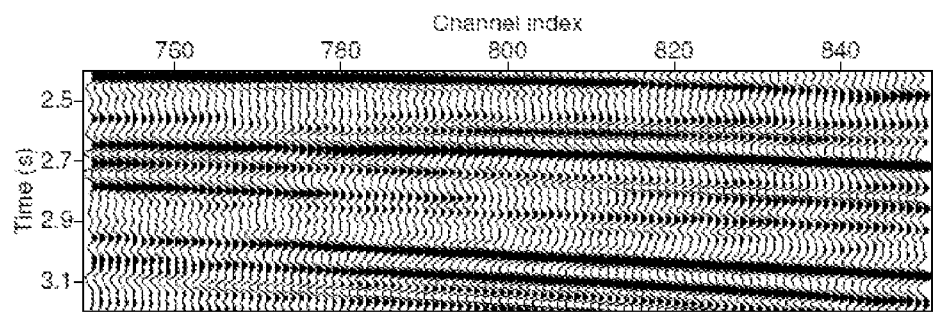
FIGS. 3a-3d illustrate plots as described in Example 1.
Figure 3B:
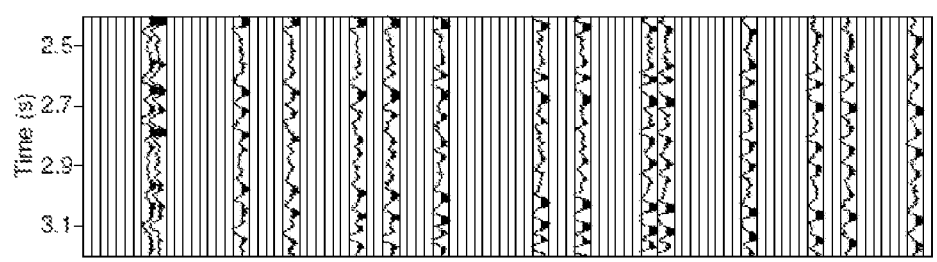
Figure 3C:
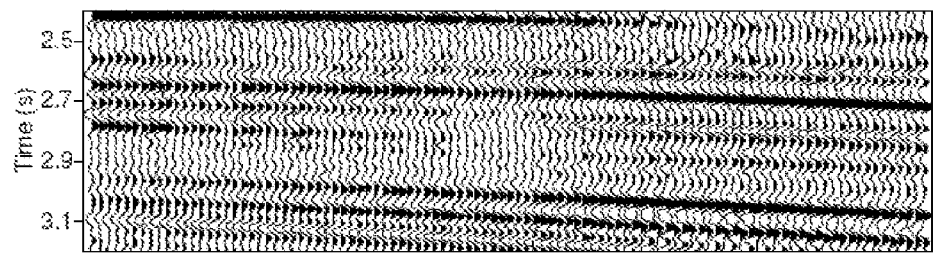
Figure 3D:
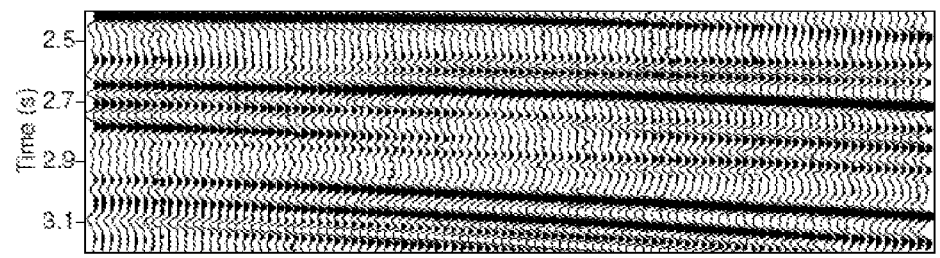

FIGS. 3a-3d illustrate (for a small window of time and receivers) reconstruction results for when the number of observed traces is 15% of the number of the reconstructed traces. In particular, FIG. 3a is the finite difference simulated data on the reconstruction grid (i.e. the true result), FIG. 3b is the set of observed traces, FIG. 3c is the synthesis-based $l_1$ reconstruction result, and FIG. 3d is the analysis-based $l_1$ reconstruction result. Finally, the computation time to produce the synthesis-based result using SPGL1 was 95 s, while the computation time to produce the analysis-based result using SeisADM was 64 s.

FIG. 2 shows that when the number of observed traces is less than 20% of the number of reconstructed traces, analysis-based $l_1$ recovery using SeisADM provides significantly higher quality (i.e. higher signal-to-noise ratio) than synthesis-based $l_1$ recovery using SPGL1. From FIGS. 3a-3d, qualitatively less noise was observed, for example, in the central part, in the SeisADM result compared to the SPGL1 result.

Real Data Example

For a real data example, data that were collected with a two-dimensional ocean bottom node acquisition geometry was used. The survey was, specifically, designed in such a way that the shots are recorded on an irregular acquisition grid. The observed data are reconstructed to a regular shot grid with 3105 shot points and 6.25 m between adjacent shots. The observed data for reconstruction are comprised of 564 of these 3105 shot points, giving a set of observed shots that is approximately 18% of the reconstructed shot points. The results are for a single ocean bottom node (common receiver gather).

Figure 4A:
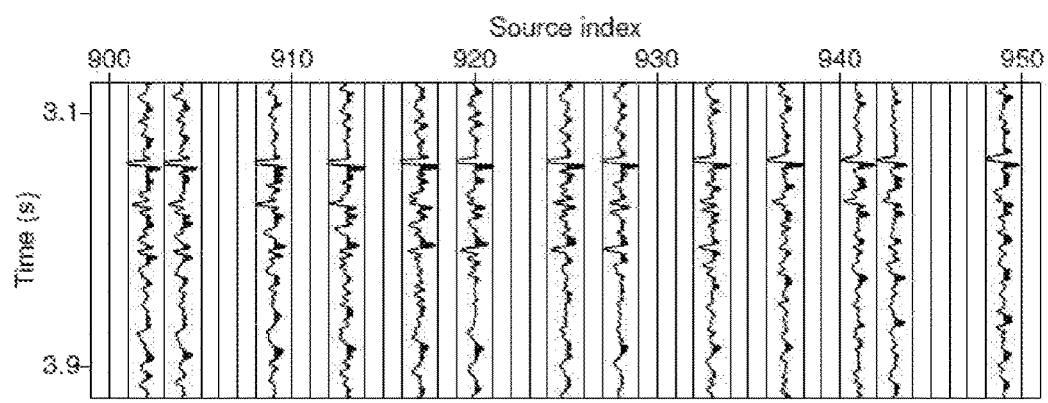
FIGS. 4a-4c illustrate plots as described in Example 1.
Figure 4B:
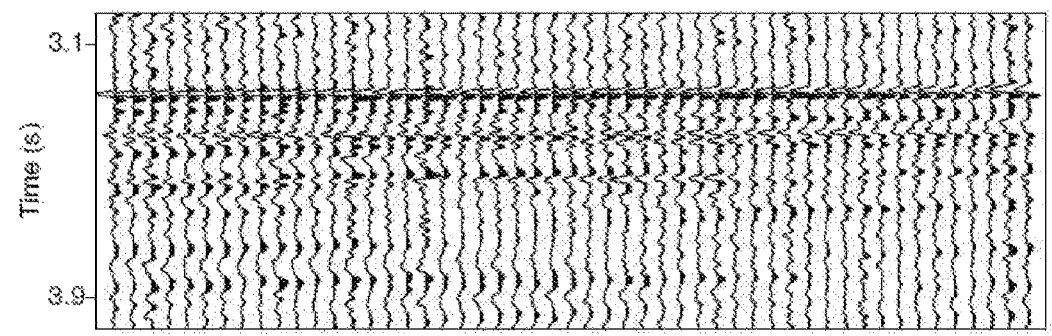
Figure 4C:
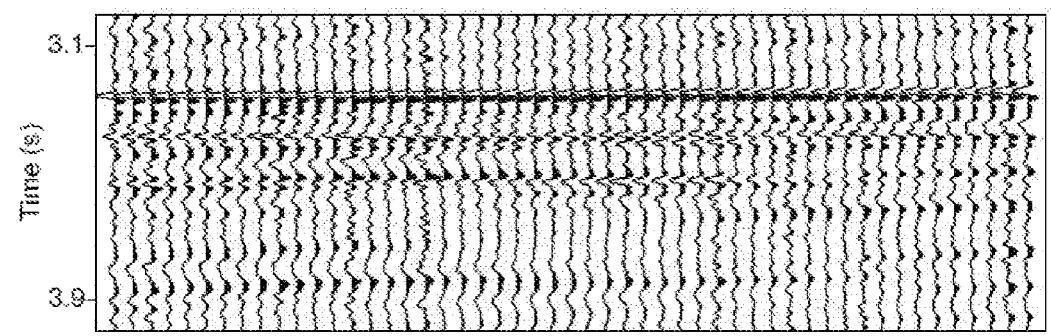
Figures 5A, 5B, 5C:
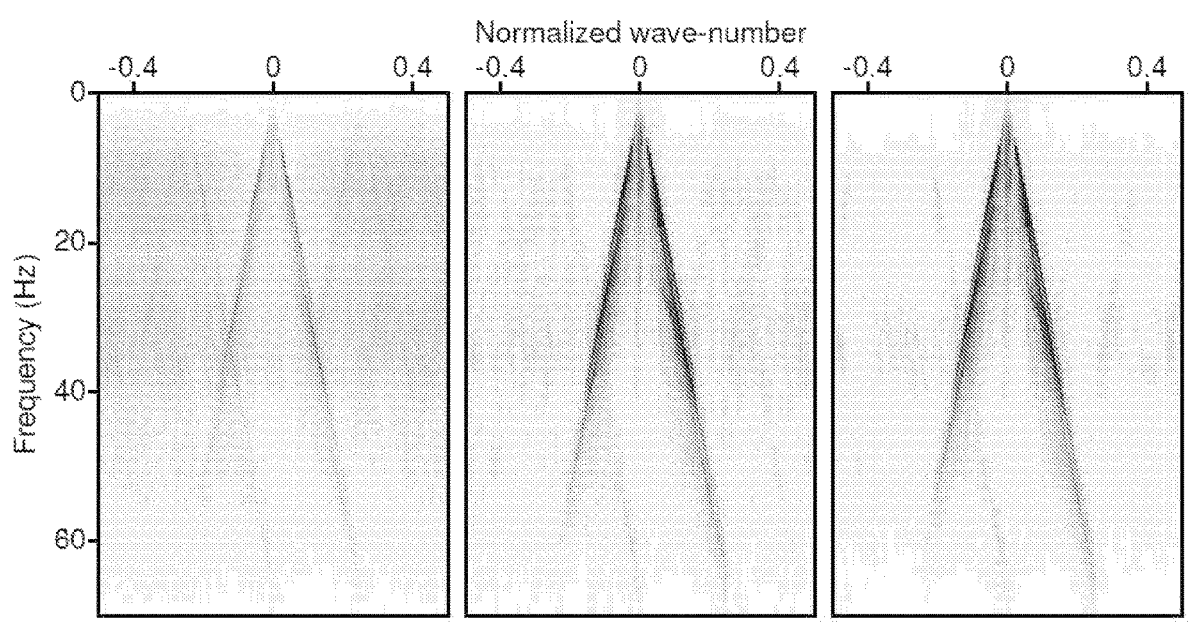
FIGS. 5a-5c illustrate Fourier spectra as described in Example 1.

FIG. 4a-4c show for a small window of shot points and time, common receiver gathers. In particular, FIG. 4a plots the observed data on the 6.25 m grid. FIG. 4b is the reconstruction result using the synthesis-based optimization model and the SPGL1 method, and FIG. 4c is the reconstruction result using the analysis-based optimization model and the SeisADM method. The seismic event at approximately 3.9 s is believed to be of higher quality in the analysis-based result (FIG. 4c) as compared to the synthesis-based result. In FIGS. 5a-5c, the corresponding f-k spectra of the data and reconstructions are plotted. In particular, FIG. 5a is the Fourier spectrum of the data, FIG. 5b is the Fourier spectrum of the synthesis-based result, and FIG. 5c is the Fourier spectrum of the analysis-based result. The run-time for the synthesis-based result using SPGL1 was 446 s compared to a run-time of 1349s for the analysis-based result using SeisADM. The f-k spectrum of the SeisADM result appears to contain less aliased energy than the f-k spectrum of the SPGL1 result.

Conclusions

In this Example, the seismic data reconstruction problem using compressive sensing was considered. In particular, the significance of the choice of the optimization model, being either synthesis- or analysis-based was investigated. The analysis-based $l_1$ recovery gave more accurate results than synthesis-based $l_1$ recovery. A new optimization method for analysis-based $l_1$ recovery, SeisADM was introduced. SeisADM takes advantage of the properties of the seismic data reconstruction problem to optimize its efficiency. The SeisADM method (used for analysis-based $l_1$ recovery) required less computation time and behaved more robust, as compared to the SPGL1 method (used for synthesis based $l_1$ recovery). While the application of SeisADM was to the reconstruction of one spatial dimension, this method may be extended to multi-dimensional data reconstruction problems.

Example 2

First, the grids used in this Example are defined: 1) the observed grid is an irregular grid on which seismic data are acquired (i.e. observed trace locations), 2) the nominal grid is a regular grid on which seismic data are reconstructed, and 3) the initial grid is a regular grid from which the observed grid is selected using, for example, a jittered sampling scheme.

Traditionally, it is assumed that the initial grid is identical to the nominal grid, and the observed grid lies on a random or jittered subset of the nominal grid. Under these settings, the model from Herrmann and Hennenfent (2008) may be utilized, $$b=Ru, x=Su \qquad (18)$$

where $b=[b_1, \ldots, b_m]^T$ are observed or acquired seismic data, and $u=[u_1, \ldots, u_n]^T$ (m<n) are data on the nominal grid (i.e., the true data). Each of $b_i$ and $u_i$ represents a seismic trace. The operator S is an appropriately chosen dictionary which makes Su sparse or approximately sparse, and R is a restriction/sampling operator which maps data from the nominal grid to the observed grid. Specifically, R is composed by extracting the corresponding rows from an identity matrix. One can recover u by solving an analysis-based basis pursuit denoising model (Can&es et al., 2008), $$\min_x \|Su\|_1 s.t. \|Ru-b\|_3 \leq \sigma \qquad (19)$$

where s corresponds to the noise level of the observed data. Many algorithms have been developed to solve this model or its variants, such as SPGL1 (van den Berg and Friendlander, 2008), NESTA (Becker et al., 2009), and YALL1 (Yang and Zhang, 2011).

Interpolated Compressive Sensing

If the observed grid is independent of the nominal grid, then the nominal grid can be determined after data acquisition. To generalize the idea of compressive sensing seismic data reconstruction, the fact that seismic data can be well approximated, locally, using a kth-order polynomial on a regular grid is utilized. For example, k=1 if the seismic data are linear in a local sense. For the sake of clarity, reconstruction of seismic data is shown along one spatial dimension, but the method can be easily extended to higher dimensions.

Denoted are the true locations on the observed grid as $p_1, \ldots, p_m$ and the true locations on the nominal grid as $l_1, \ldots, l_n$. For $j=1, \ldots, m$ and $k \ll n$, $$s_j \triangleq \operatorname{argmin}_{s \in \{1, \ldots, n-K\}} \Pi_{i=D}^{k} |p_j - l_{s+i}| \tag{20}$$

This is easy to solve due to the fact that $l_1, \ldots, l_x$ are equally spaced. When $p_j$ is not close to the boundary of the nominal grid, $$l_{s_j + \lfloor k/2 \rfloor - 1} \le p_j \le l_{s_j + \lfloor k/2 \rfloor + 1} \tag{21}$$

Based on the assumption made at the beginning of this section, given $u_{s_j}, \ldots, u_{s_{j+k}}$ for any $j=1, \ldots, m$, $b_j$ can be well approximated using kth-order Lagrange interpolation (e.g. Berrut and Trefethen, 2004); i.e., $$b_j \approx \Sigma_{i=0}^{k} L_{j, s_{j+i}} u_{s_{j+i}} \tag{22}$$

where, $$L_{j, s_j + i} = \prod_{h=0, h \ne i}^{k} \left( \frac{p_j - l_{s_j + h}}{l_{s_j + i} - l_{s_j + h}} \right) \tag{23}$$

Supposing that $u(x)$ denotes the continuous seismic data in some local window, and $u(x)$ is at least $k+1$ times continuously differentiable. According to the Taylor expansion, the error estimation of Lagrange interpolation is $$|e_j| = \frac{|u^{(k+1)}(\xi_j)|}{(k+1)!} \prod_{i=0}^{k} |p_j - l_{s_j + 1}| \tag{24}$$

for some $l_{s_j} \le \xi_j \le l_{s_{j+k}}$. This also implies the choice of $s_j$ as defined in equation 3.

Inspired by equation 5, interpolated restriction operator is $$\tilde{R} = \begin{pmatrix} \tilde{r}_{1,1} I & \cdots & \tilde{r}_{1,n} I \\ \vdots & \ddots & \vdots \\ \tilde{r}_{m,1} I & \cdots & \tilde{r}_{m,n} I \end{pmatrix} \tag{25}$$

where, $$\tilde{r}_{j,i} = \begin{cases} L_{j,i}, & \text{if } s_j \le i \le s_{j+k}, \\ 0, & \text{otherwise} \end{cases} \tag{26}$$

and the size of the identity matrix I is decided by the number of time samples. Then equation 22 can be rewritten as, $$b \approx \tilde{R} u \tag{27}$$

This demonstrates an implementation of the interpolated compressive sensing model for seismic data reconstruction. Analogous to equation 19, u can be recovered by solving the following optimization problem, $$\min_u \|Su\|_1 \, s.t. \, \|\tilde{R}u - b\|_2 \le \sigma \tag{28}$$

One should note that the method described above is fundamentally different from the method which first interpolates the observed data back to nearest points on the nominal grid and then reconstructs using traditional compressive sensing. The proposed method utilizes the unknown data on the nominal grid as an interpolation basis to match the observed data and forms an inverse problem to recover the unknown data. Theoretically, the interpolation error is $O(\Delta h^{k+1})$ where $\Delta h$ is the average spacing of the interpolation basis. Since the nominal grid is much finer than the observed grid (i.e., smaller average spacing), interpolated compressive sensing is expected to be more accurate than first interpolating followed by reconstructing. Moreover, for interpolated compressive sensing, the error could be further attenuated by solving a BP denoising problem such as in equation 28 (Candes et al., 2008).

The computational cost is usually dominated by evaluating $\tilde{R}^T \tilde{R} u$ and $S^T S u$ at each iteration, which is approximately $O(kN)$ and $O(N \log N)$ respectively, assuming S has a fast transform (N is the number of samples). Therefore, for seismic data reconstruction, the computational cost for solving the interpolated compressive sensing problem in equation 28 is comparable to solving the traditional compressive sensing problem in equation 19 when $k \ll N$. As the order k increases, the accuracy of reconstruction may become higher at the cost of increasing computational burden.

If $k=1$ in equation 22, then our method is called linear-interpolated compressive sensing. Likewise, if $k=3$, our method is called cubic-interpolated compressive sensing. In our tests, linear- and cubic-interpolated compressive sensing give comparable and satisfactory reconstruction results. The case $k>3$ may only apply to few extreme cases. The following data examples focus on the linear- and cubic-interpolated compressive sensing data reconstruction.

Synthetic Data Example

In order to simulate the scenario that the nominal grid does not necessarily include the observed grid, and also be able to do quantitative analysis, start with a finer initial grid for jittered sampling, and select a uniform subset from the initial grid as the nominal grid for reconstruction and computing signal-to-noise ratios. The $l_1$ solver used to solve the problem in equation 28 is based on the alternating direction method proposed by Yang and Zhang (2011). Specifically, the results from two special cases—linear and cubic—of the proposed interpolated compressive sensing with the results from traditional compressive sensing are compared. In an effort to make fair numerical comparisons, the same solver for both traditional and interpolated compressive sensing is used.

For the synthetic example, data generated from the Sigsbee 2a model (Bergsma, 2001) and a two-dimensional acoustic finite-difference simulation are considered. For each common receiver gather, the data are reconstructed to a nominal grid with 306 shot points, with a spacing of 22.89 m between adjacent shot points. The observed shot points are selected from a regular shot point grid with 7.62 m spacing using a jittered algorithm (Hennenfent and Herrmann, 2008). Experiments were performed where the number of observed shot points varies from 15% to 50% of the 306 grid points on the nominal grid. There was a mismatch between the nominal grid for reconstruction and the initial grid used to generate the observations; therefore, an observed shot-point does not necessarily correspond to any given point on the reconstruction grid, making the interpolated compressive sensing method applicable.

Figure 6:
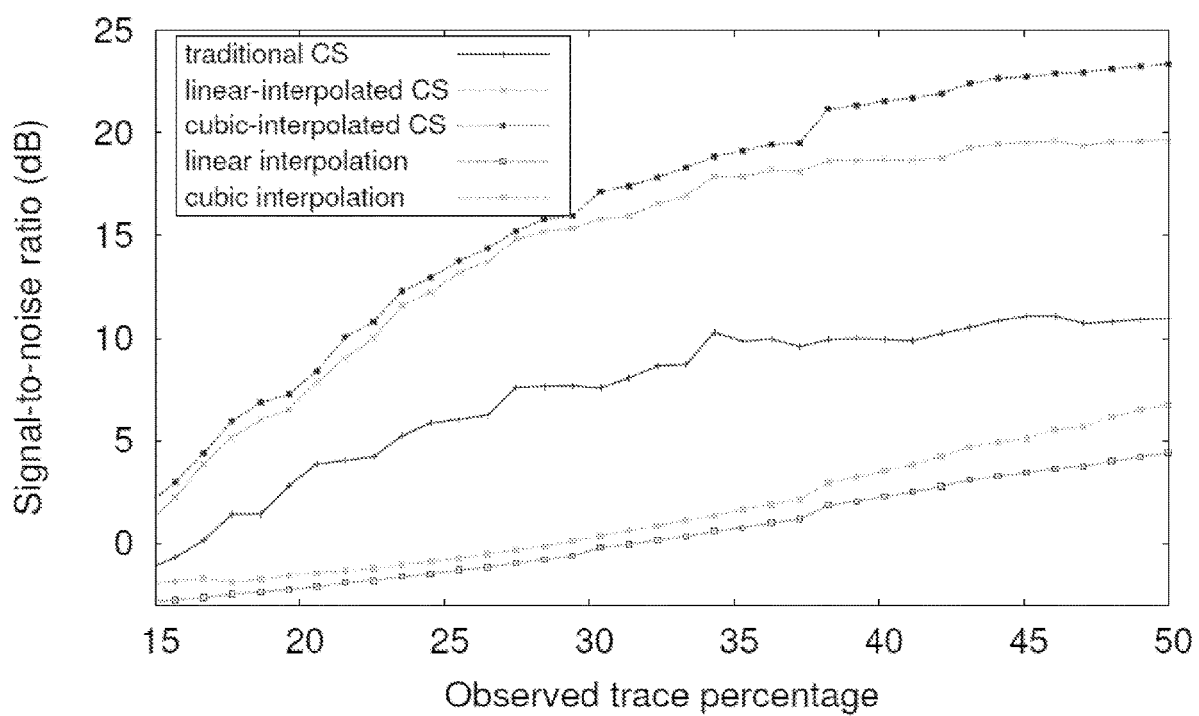
FIG. 6 illustrates a plot as described in Example 2.
Figures 7A, 7B, 7C, 7D, 7E:
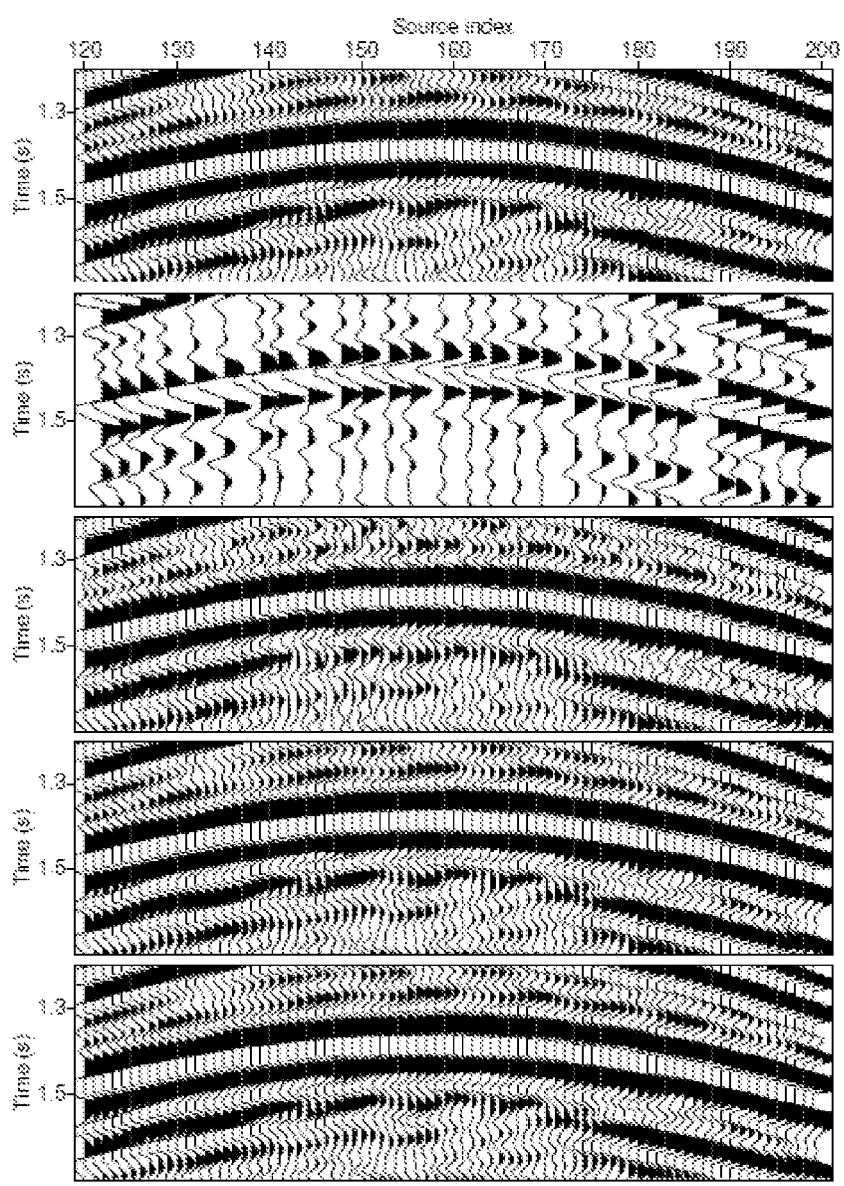
FIGS. 7a-7e illustrate plots as described in Example 2.

The signal-to-noise ratios for reconstruction results is shown in FIG. 6 for traditional compressive sensing (with nearest neighbor resampling), linear-interpolated compressive sensing, and cubic-interpolated compressive sensing. For reference, data reconstruction results for linear and cubic interpolation are shown, but without the use of compressive sensing data reconstruction. For each data point in FIG. 6, an average signal-to-noise ratio computed from performing 20 data reconstructions, each on a different common receiver gather may be used. FIGS. 7a-7e show data reconstruction results for a small window of source points and time of a common receiver gather when there are 108 traces in the observed common receiver gather (35% of the reconstructed traces). In particular, FIG. 7a shows data on the nominal reconstruction grid, computed using the finite-difference simulation, and FIG. 7b shows the observed data used for reconstruction. The remaining sections in FIG. 7 show data reconstruction results for traditional compressive sensing (FIG. 7c), linear-interpolated compressive sensing (FIG. 7d), and cubic-interpolated compressive sensing (FIG. 7e).

A qualitative inspection of FIG. 7, confirms the quantitative results shown in FIG. 6. Namely that linear- and cubic-interpolated compressive sensing data reconstruction perform similarly, and, for this scenario, provides a large uplift in the signal-to-noise ratio as compared to traditional compressive sensing data reconstruction. In addition, all types of compressive sensing data reconstruction outperform data reconstruction using linear and cubic interpolation.

Real Data Example

Marine data was used which were collected by shooting in an irregular acquisition pattern and recorded with a two-dimensional ocean bottom node acquisition geometry. Two reconstruction experiments using this dataset were utilized. In the first, the observed data are reconstructed to a nominal shot grid with 2580 shot points and 7.5 m spacing between adjacent shots. In the second, the observed data are reconstructed to a nominal shot grid with 2037 shot points and 9.5 m spacing between adjacent shots. The observed data for reconstruction are comprised of 400 shot points that are selected from an initial grid with 6.25 m spacing between adjacent shots points, and 3096 grid points. Similar to the synthetic example, there is a mismatch between the nominal grids for reconstruction, and the initial grid used to collect the data. Therefore, as before, an observed shot point does not necessarily correspond to any given point on the nominal grid.

Figure 8:
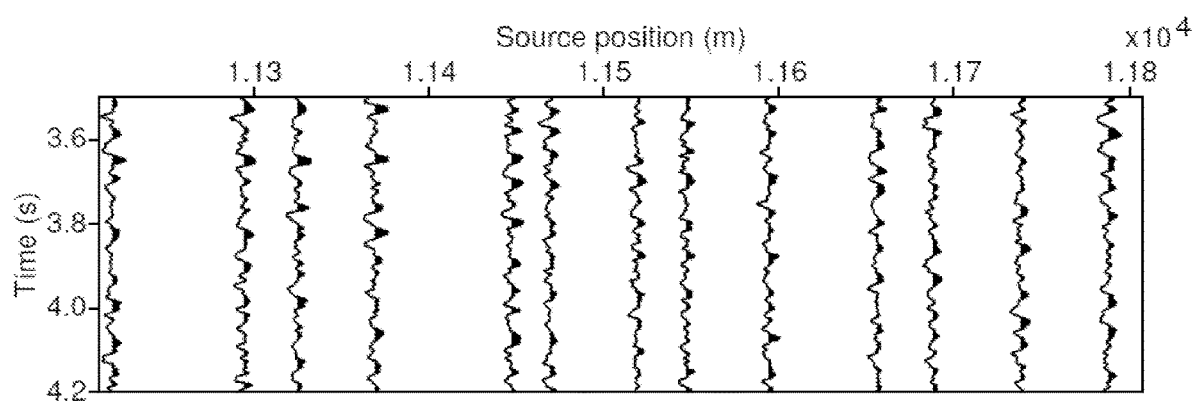
FIG. 8 illustrates a plot as described in Example 2.
Figure 9A:
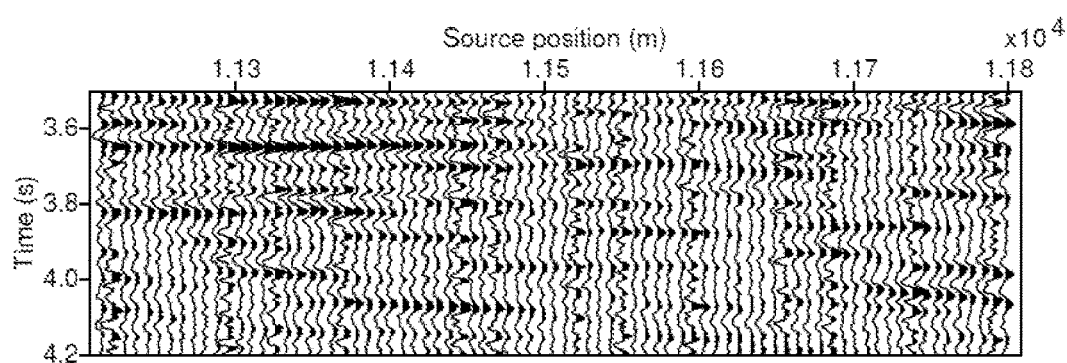
FIGS. 9a-9c illustrate plots as described in Example 2.
Figure 9B:
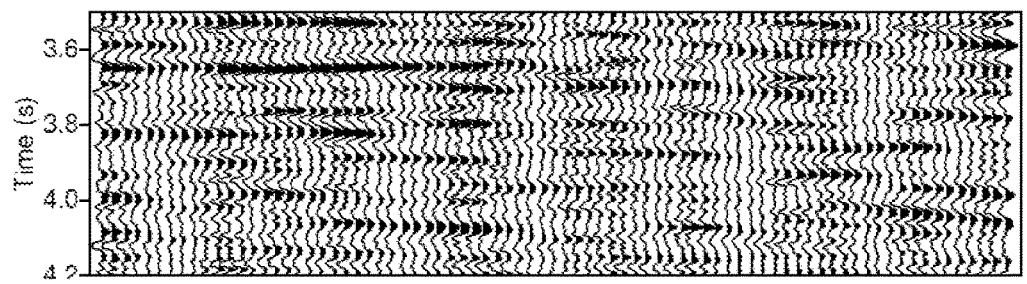
Figure 9C:
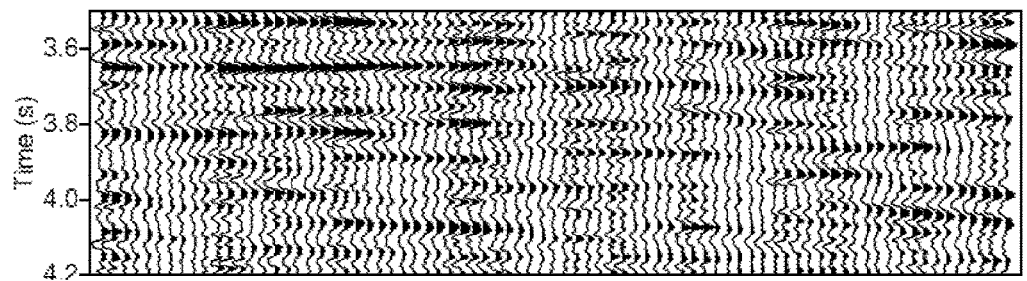
Figure 10A:
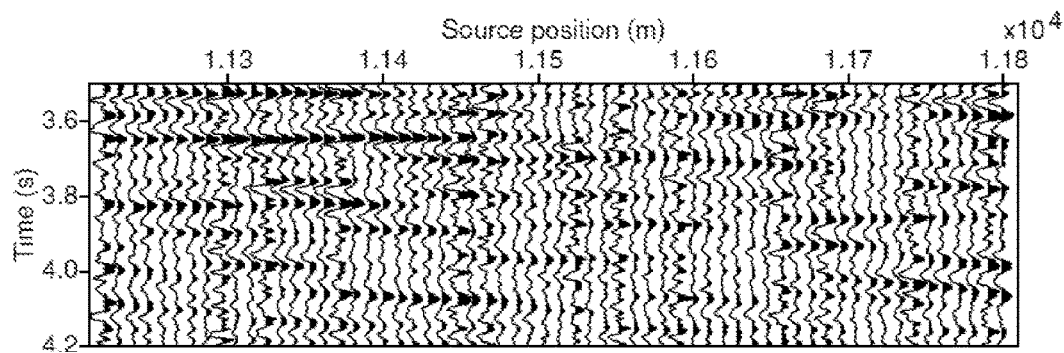
FIGS. 10a-10c illustrate plots as described in Example 2.
Figure 10B:
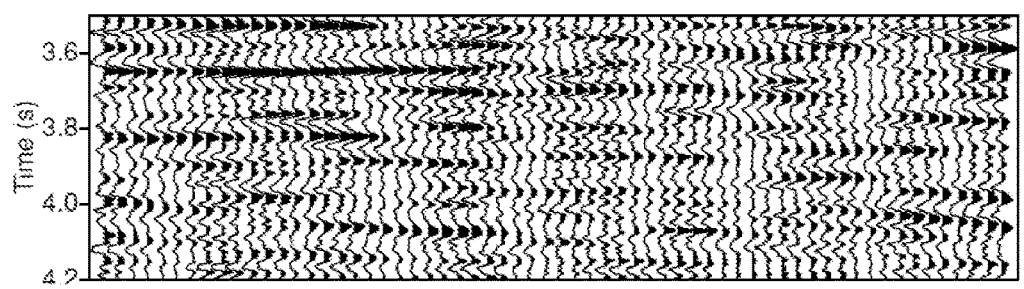
Figure 10C:
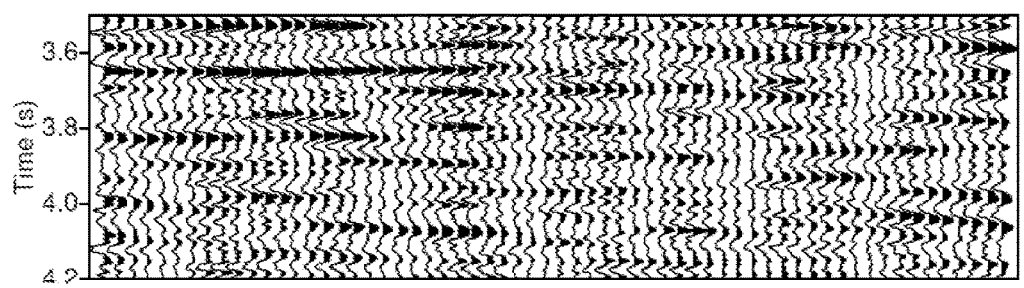

FIG. 8 shows the acquired data for a small window of time and source points. Reconstruction results are shown for the 7.5 m nominal grid in FIGS. 9a-9c for the same window of time and source points. In particular, traditional (FIG. 9a), linear-interpolated (FIG. 9b), and cubic-interpolated (FIG. 9c) compressive sensing data reconstruction results are shown. Similarly, the results for the 9.5 m nominal grid within the same window of time and source points are shown in FIG. 10a-10c, where the traditional, linear-interpolated, and cubic-interpolated compressive sensing data reconstruction results are shown in FIGS. 10a, 10b and 10c respectively.

Even though the seismic data are reconstructed to different nominal grids with different spacing, the results shown in FIGS. 9 and 10 are consistent with each other. In both cases, although the effect is subtle, the seismic data recovered using interpolated compressive sensing show less acquisition footprint. Besides, the expression of the seismic events now, for instance, in the lower right hand corner seems more geologically plausible than the traditional compressive sensing result might suggest.

Conclusions

A novel data reconstruction method, interpolated compressive sensing has been developed. The method allows for a mismatch between the nominal grid that the data are reconstructed to, and the observed grid upon which the data are acquired. This method allows for any dictionary, used in the compressive sensing data reconstruction model, to be applied to the regular nominal grid. The relationship between the observed and nominal grids is given by the interpolated restriction operator. The interpolated restriction operator, in turn, accounts for both the reduced size of the observed grid, and for when a point on the observed grid does not correspond to a nominal grid point. The latter is done by incorporating Lagrange interpolation into the restriction operator. The interpolated compressive sensing method was applied to both synthetic and real data examples, incorporating both 1st and 3rd order Lagrange interpolation into the interpolated restriction operator. The synthetic results compare linear- and cubic-interpolated compressive sensing to traditional compressive sensing, showing a significant increase in the signal-to-noise ratio of the reconstructed data. Finally, the method was applied to a real data example, and observed an uplift in quality as compared to traditional compressive sensing.

Example 3

This example finds the optimal sampling grid in a seismic data reconstruction problem. The seismic data reconstruction model can be described as (e.g. Herrmann, 2010), $$b = Dx, D = RS^*, x = Su \qquad (29)$$

where b are seismic data on the observed grid, and u are data on the reconstruction grid (i.e. the true data). The matrix R is a restriction (i.e. sampling) operator, and maps data from the reconstruction grid to the observed grid. If S is a suitably chosen, possibly over-complete, dictionary, then x will have small cardinality (i.e. $l_0$-norm).

Compressive Sensing Optimization Model and Mutual Coherence

Given the under-determined system in equation 29 and the data b, the reconstructed seismic data u is found by solving an analysis-based basis pursuit denoising optimization model (e.g. Candes et al., 2008), $$\min_u \|Su\|_1 \, s.t. \, \|Ru - b\|_2 \leq \sigma \qquad (30)$$

There are many algorithms that can be employed to find the solution of the optimization model in equation 30. In this Example, a variant (Li et al., 2012) of the alternating direction method (e.g. Yang and Zhang, 2011) is used. At least one goal is to design R (i.e. the sampling grid) such that for a given b and S, u is more likely to be recovered successfully.

Compressive sensing provides theorems that give conditions for a successful data reconstruction. For the moment, we consider the following scenario: 1) $S \in R^{n \times m}$ is an orthonormal matrix, 2) $R \in R^{n \times m}$ with n>m, 3) $D = RS^*$ is such that D is a selection of m rows from $S^*$, and 4) $D = RS^*$ is such that the columns of D, $d_1$, have unit energy ($\|d_i\|_2 = 1$, i=1 ... n). Under this scenario, solving the optimization program in equation 30 recovers u successfully with overwhelming probability when (Candes et al., 2006), $$\mu \leq \sqrt{\frac{C}{S} \frac{m}{(\log n)^b}} \qquad (31)$$

In equation 31, C is a constant, and S is the cardinality of Su. Importantly, for our analysis, μ the mutual coherence and is a function of S and R. In particular (Donoho and Elad, 2002)

$$\mu(R,S) = \max_{i \neq j} |d_i^* d_j|, i,j = 1 \ldots n \qquad (32)$$

This is equivalent to the absolute maximum off-diagonal element of the Gram matrix, $G = D^*D$. Within the context of the seismic data reconstruction problem, n is proportional to the number of seismic traces on the reconstruction grid, and m is proportional to the number of traces on the observed grid. Therefore, if S and C are constant, then for a given number of observed traces, decreasing m increases the chance of a successful data reconstruction.

The relation between mutual coherence (equation 32) and the condition for exact recovery (equation 31), make its analysis appealing. Unfortunately, for problems in seismic data reconstruction it would be prohibitively expensive to compute. However, if S is the discrete Fourier transform matrix, then one can find an efficient method to compute mutual coherence, and use this as a mutual coherence proxy for when S is some over-complete (but perhaps still Fourier derived dictionary such as the windowed Fourier transform.

To derive the mutual coherence proxy, one may begin by following Hennenfent and Herrmann (2008), and note that for the seismic data reconstruction model, R*R is a diagonal matrix with its diagonal being the sampling grid, $$r = [r_1 r_2 \ldots r_n] \qquad (33)$$

hence, $$[R^*RS^*]_{i,j} = \sum_{k=1}^{n} [R^*R]_{i,k}[S^*]_{k,j} = r_i[S]_{i,j} \qquad (34)$$

and the Gram matrix is, $$[G]_{i,j} = [D^*D]_{i,j} = [SR^*RS^*]_{i,j} = \sum_{k=1}^{n} [S]_{i,k}[S^*]_{k,j} r_k \qquad (35)$$

If S is a discrete Fourier transform matrix, then $[S]_{i,j} = \omega^{ij}$, where $\omega = \exp(-2\pi\sqrt{-1}/n)$, and from equation 35, $$[G]_{i,j} = [D^*D]_{i,j} = \sum_{k=1}^{n} r_k \omega^{k(i-j)} \qquad (36)$$

Equation 36 shows that off-diagonal elements of the Gram matrix are equal to the non-d.c. components of the Fourier transform of the sampling grid r. Therefore, $$\mu(r) = \max_{i \neq 0} |\hat{r}_i| = \max_{l \neq 0} \left| \sum_{k=1}^{n} r_k(t)^{kl} \right| \qquad (37)$$

where $\hat{r}_l$ are Fourier transform coefficients. Equation 37 can be computed efficiently using the fast Fourier transform, and is our mutual coherence proxy. It is exactly the mutual coherence when S is the Fourier transform, and a proxy for mutual coherence when S is some over-complete dictionary.

Greedy Optimization Algorithm for Acquisition Design

Given the mutual coherence in equation 37, a sampling grid r according to the optimization program is $$r_* = \arg \min_r \mu(r) \qquad (38)$$

where µ given by equation 37. The optimization program in equation 38 is non-convex. To find its solution, a randomized greedy algorithm is proposed. One can think of it as a deterministic alternative to the statistical result found in Hennenfent and Herrmann (2008). The algorithm will find a local minimum, and, therefore, does not guarantee convergence to a global minimum. However, in practice, it has been observed that solutions finding a local minimum using our randomized greedy algorithm are sufficient.

The randomized greedy algorithm for solving equation 38 is shown in Algorithm 1. The algorithm is initialized using a regular sampling grid, where the spacing of the regular grid is Δr=n/m, so that for any integer j∈{0, 1, . . . , m−1}, the elements of r (equation 33) are, $$r_i = \{1, i=j\Delta r+1 \; 0, i \neq j\Delta r+1 \qquad (39)$$

and where for the sake of simplicity in our description, one can assume that n is an integer multiple of m. Dividing the reconstruction grid into m disjoint subsets of size Δr grid points, and where the jth subset is, $$s_j = \{j\Delta r - \lfloor \Delta r/2 \rfloor + k | k=1 \ldots \Delta r\} \qquad (40)$$

where $\lfloor x \rfloor$ denotes integer component of x. In other words, except at the boundaries of the grid, the jth subset is centered on the jth grid point of the regular observed grid. The ordered sets $s_j$ are stored in I, and we store a corresponding random ordering of these sets using J=PI, and where P is a random perturbation matrix. The algorithm sequentially steps through the sets in J, and uses a jittering technique so that for each of the Δr elements in $s_j$, its corresponding grid point is set to 1 while all others are set to 0, producing a new sampling grid $r_k$. Subsequently, the mutual coherence $\mu_k = \mu(r_k)$ is computed using equation 37, and compared to the mutual coherence of r. If a perturbation, $$k_* = \arg \min_k \mu(r_k) \qquad (41)$$

on r is found that reduces the mutual coherence, then r is set to $r_k$, before iterating to the next sets $s_j \in J$. Hence, the algorithm runs in a fixed number of iterations equal to mΔr, and where the expense at each iteration is dominated by the computation of the mutual coherence of the sampling grid computed via the fast Fourier transform (equation 37). Therefore, the total expense of the algorithm is $O(n^2 \log n)$.

Algorithm 1 Randomized greedy algorithm
r←0, Δr←n/m
$r_i$←1, for i=jΔr, j=0, 1, . . . , m−1
$s_j$←{jΔr−⌊Δr/2⌋×k|k=1 . . . Δr}, j=0, 1, . . . , m−1
I←[$s_0$ $s_1$ . . . $s_{m-1}$], J←PI
for j=0→m−1 do
 $s_i$←[J]$_i$, $\mu_0$=µ(r), r'←r
 for ∀k∈$s_j$ do
  r'$_{(s_j)}$←{0}, r'$_k$←1, $\mu_k$←µ(r')
 end for
 If min{$\mu_k$}<$\mu_0$ then
  $\mu_0$←min{<$_k$}, r←r'
 end if
end for
$r_x$←r Synthetic Data Example For a synthetic data example, data generated from the Sigsbee 2a model (Bergsma, 2001), and a two-dimensional acoustic finite difference simulation were used. The data reconstruction of a single common receiver gather, and where 184 observed traces are reconstructed to a regular grid with 920 sources and 7.62 m between adjacent sources were considered. Hence, the observed data has 20% as many traces as the reconstructed data. In the data reconstruction model (equation 29), S was allowed be a two-dimensional windowed Fourier transform.

Figure 11A:
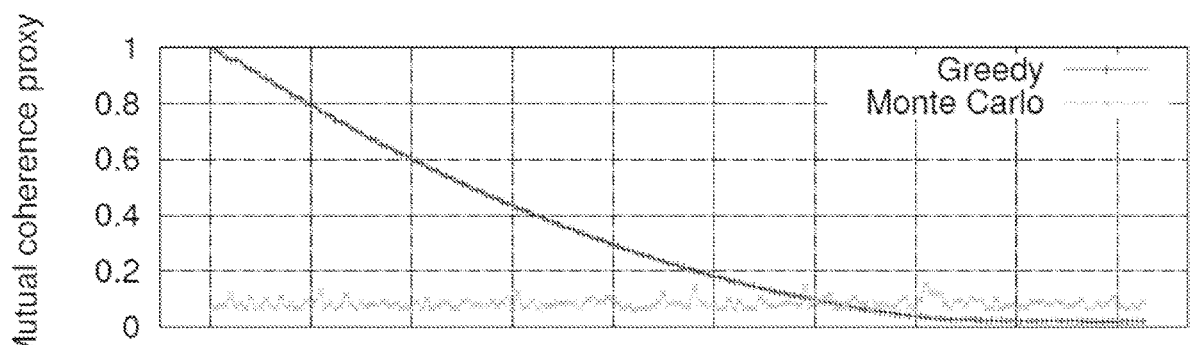
FIGS. 11a-11b illustrate plots as described in Example 3.
Figure 11B:
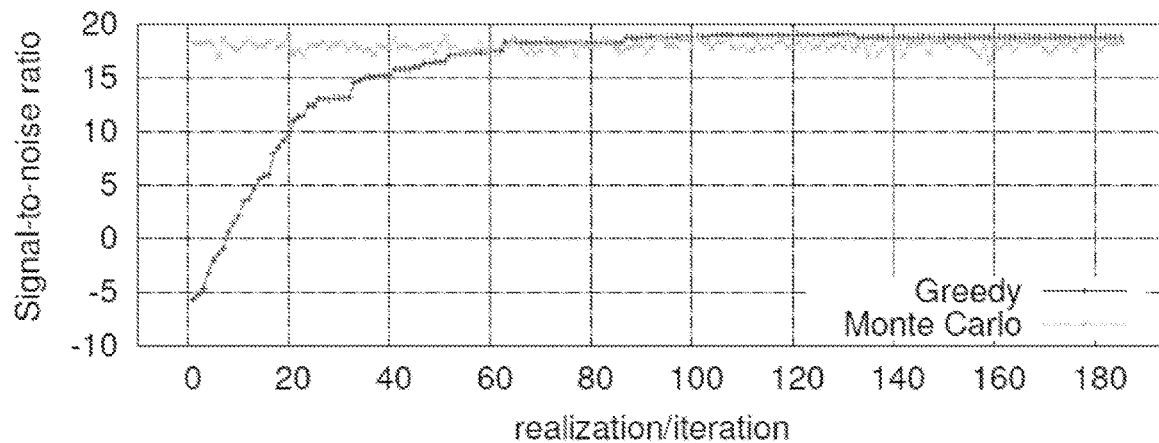

The results are shown in FIG. 11a-11b which plot the mutual coherence proxy (equation 38) versus the iteration of the randomized greedy algorithm. In total there are 185 iterations, including its initialization to a regular sampling grid. For comparison, a Monte Carlo simulation generated 185 realizations of R where for each row of R, its non-zero column is selected using a random jitter technique with a uniform probability density function.

The Monte Carlo realizations of the restriction operator R give, consistently, small values for their mutual coherence proxy (FIG. 11a), and correspondingly good values for the signal-to-noise ratios of the reconstructed data, as shown in FIG. 11b. This is an expected result, and is shown in Hennenfent and Herrmann (2008). As the greedy optimization algorithm iterates, the mutual coherence approaches and then surpasses the mutual coherence computed from the Monte Carlo realizations. Likewise, the signal-to-noise ratios found from the randomized greedy optimization algorithm approach similar values to those found from the Monte Carlo method. The optimal sampling grid using the greedy algorithm was achieved by jittering 134 of the 184 observations, a result that is not necessarily predicted by the analytic result in Hennenfent and Herrmann (2008). However, both the Monte Carlo and randomized greedy algorithms produced sampling grids that result in successful seismic data reconstructions.

Real Data Example

For the real data example, data that was collected with a two-dimensional ocean bottom node acquisition geometry were used. The survey was, specifically, designed in such a way that the shots are recorded on an irregular acquisition grid. The observed data is reconstructed to a regular shot grid with 3105 shot points and 6.25 m between adjacent shots. The observed data for reconstruction is comprised of 400 of these 3105 shot points, giving a set of observed shots that is approximately 13% of the size of the set of reconstructed shot points. The results for a single ocean bottom node (common receiver gather) is shown. As was the case for the synthetic data example, S was allowed be a two-dimensional windowed Fourier transform.

Figure 12A:
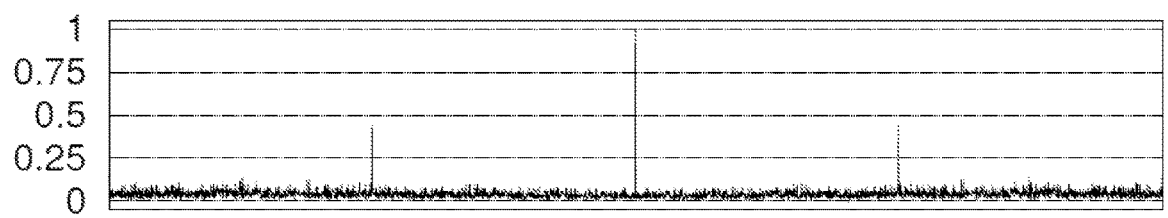
FIGS. 12a-12b illustrate plots as described in Example 3.
Figure 12B:
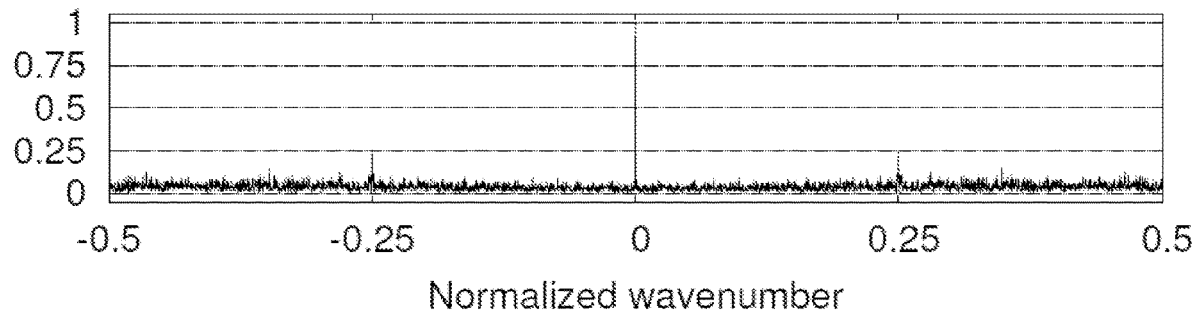
Figure 13A:
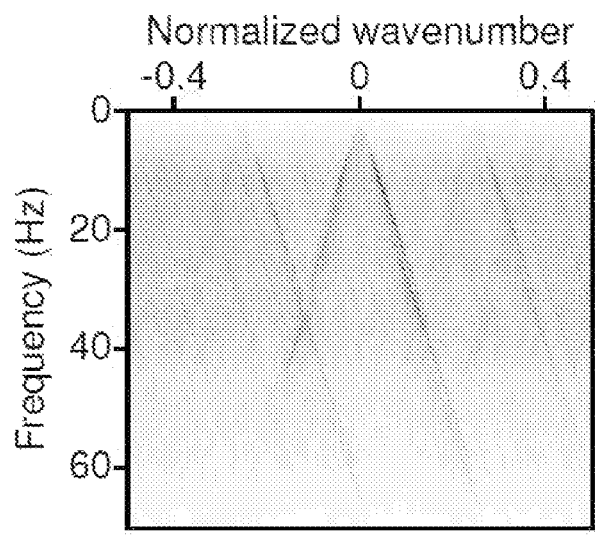
FIGS. 13a-13d illustrate plots as described in Example 3.
Figure 13B:
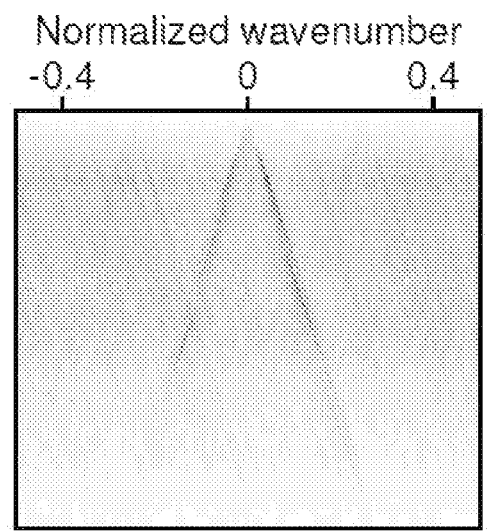
Figure 13C:
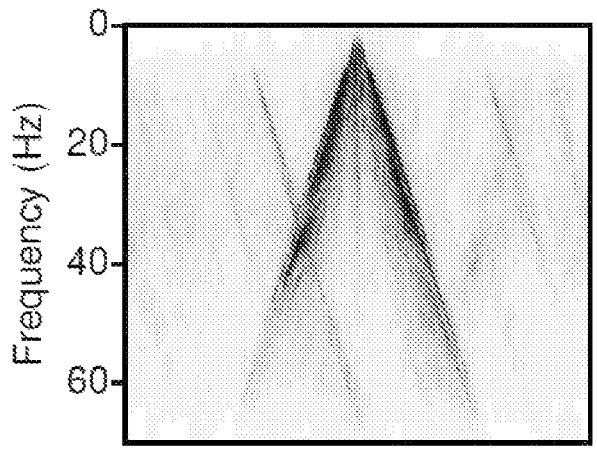
Figure 13D:
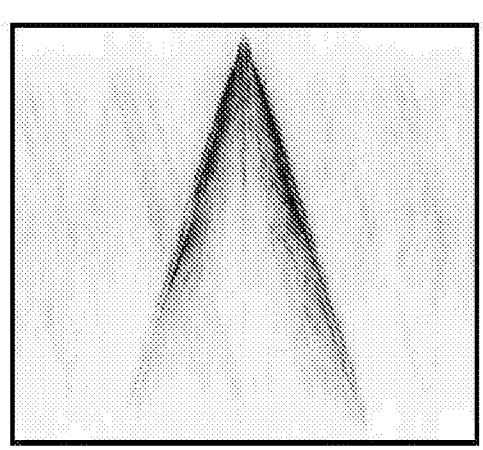

Amplitude spectra of the sampling grids ($|\hat{r}_1|$ in equation 37) are shown in FIGS. 12a-12b. In particular, FIG. 12a shows the Fourier spectrum of a sampling grid with a large mutual coherence proxy ($\mu$=176) and FIG. 12b shows the Fourier spectrum of a sampling grid with a small mutual coherence proxy ($\mu$=99). As expected, the large mutual coherence case corresponds to larger non-d.c. components than the low mutual coherence case. As shown, the f k-spectra of common receiver gathers for the high (FIGS. 13a and 13c) and low (FIGS. 13b and 13d) mutual coherence sampling grids. In particular, FIGS. 13a-13b plot the f k-spectra of the observed data, and FIGS. 3c-d plot the f k-spectra of the reconstructed data. In the f k-spectra of the high mutual coherence case, coherent aliased energy (FIGS. 13a and 13c) was observed. In the low mutual coherence case (FIGS. 13b and 13d), this energy is attenuated.

Figure 14A:
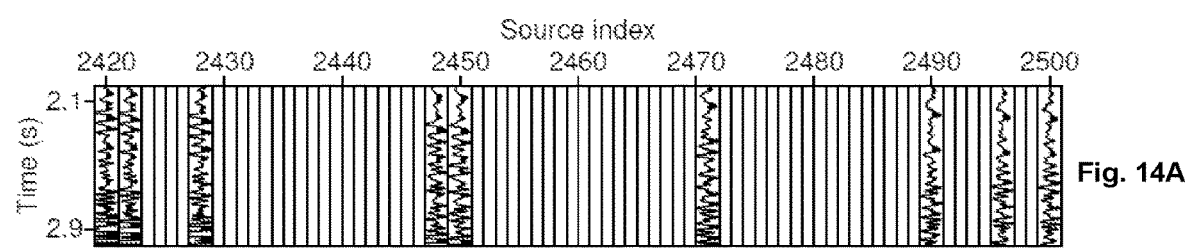
FIGS. 14a-14d illustrate plots as described in Example 3.
Figure 14B:
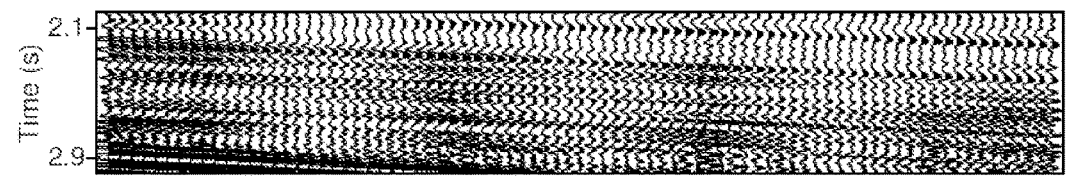
Figure 14C:
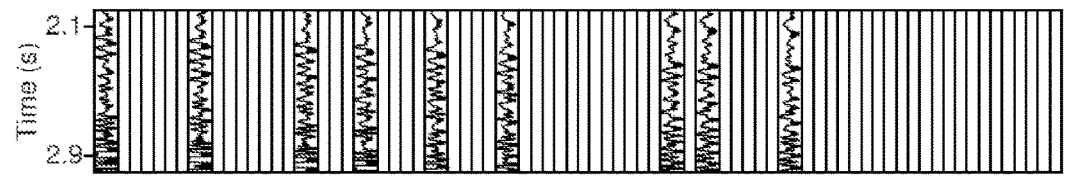
Figure 14D:
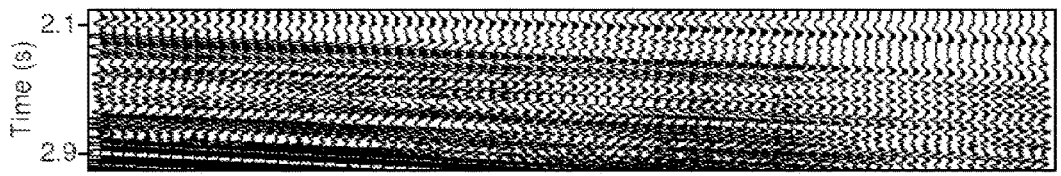

Finally, FIGS. 14a-14d plot a common receiver gather for a small window of time and source points before and after data reconstruction for the low and high mutual coherence sampling grids. In particular, FIGS. 14a-14b plot, respectively, the observed and reconstructed data for the high mutual coherence sampling grid, and FIGS. 14c-14d plot, respectively, the observed and reconstructed data for the low mutual coherence sampling grid. Qualitatively, the acquisition footprint is easier to see in the high mutual coherence case, as compared to the low mutual coherence case. These observations are consistent with those made on the corresponding f k-spectra (FIG. 13).

Example 4

The Non-Uniform Optimal Sampling (NUOS) technology may be used to fire two different sized gun arrays independently in a 2D sense to acquire data that is optimized both for the deep geological section and the shallow geological section at the same time. The common problem with deep array targeting is that it is geared for low frequencies and tends to be sampled relatively sparsely due to seismic record lengths. For example, one implementation may comprise 37.5 m shot separation on 18 second records. Shallow data on these 'deep' records may be degraded and under-sampled spatially. A dataset directed to shallow data may be acquired at 12.5 m shots and 5 second records. It would be beneficial to be able to obtain both datasets at the same time or obtain one dataset that is separable, so that only one pass of the acquisition equipment is required in a survey area.

Using NUOS methodology, one implementation provides for acquisition of the deep tow gun array on, for example, the port guns and use the starboard gun array to shoot for shallow targeted acquisition, so that the shallow and deep data are simultaneously recording, providing a very efficient acquisition that requires one pass over the survey area instead of two. Each gun array will have its own unique encoding, selected to be as incoherent as practical relative the other array. Then the deep and shallow data may be acquired independently and then the records separated or de-blended after acquisition. Each gun array can fire independently of the other and not substantially interfere. The method cuts costs of acquisition in half compared to the conventional approach.

The two different gun arrays are tuned for different objectives in a marine 2D towed streamer survey. Both objectives may be acquired independently with a single pass of the vessel and the data de-blended into independent 2D lines. Implementations provided allow acquisition of twice as much data with optimal sampling for the acquisition costs of one 2D line instead of the costs of acquiring two lines. The problem of trying to acquire both deep and shallow data with one gun array or not getting one or the other dataset is avoided.

A long-standing issue in data acquisition and processing has been selecting optimal locations for sources and receivers. It is understood that random sampling may be able to recover broader bandwidth from a fixed set of samples, which may be random, than from uniform sampling. As an improvement over random sampling, implementations herein provide methodologies for improved means for selecting source and receiver locations in seismic surveys. NUOS uses concepts from compressive sensing along with optimization algorithms to identify source or sensor positions that satisfy optimization constraints for a particular survey. After optimizing source or sensor locations, the NUOS approach then uses compressive sensing algorithms to recover significantly broader spatial bandwidth from non-uniform sampling than would be obtained using conventional uniform sampling. For example, NUOS technology recovers spatial bandwidth equivalent to 12.5 m uniform sampling using the same number of samples as would be used for a 25 m sampled survey, with significant improvements over conventional surveys. The technology may be used to reduce costs per area or to survey a larger area with the same amount of equipment, or to increase survey resolution.

In NUOS source design for one example implementation, a nominal 37.5 meter shot spacing from each gun position may vary between 25 meters to 50 meters. This can provide a reconstructed equivalent spacing of 12.5 meters. This increases in-line resolution and improves denoising and demultiple workflows.

According to conventional Nyquist sampling theory, survey layout design would not be an issue if the earth were sampled to two points per wavelength in each dimension. Practically, orders of magnitude fewer sampling points than Nyquist theory would dictate are obtained in conventional or normal surveys. Limited sources and receivers is a classic "Np-Complete" problem, in that an optimal solution can only be found by investigating every possible combination of source and receiver locations. Fold and azimuth distribution are examples of cost functions we routinely use for seismic survey design.

More advanced cost functions for survey design obviously make the optimization problem more complex, as the computational cost of evaluating a single solution increases. Compressive sensing (i.e. Baraniuk, 2007) and convex optimization (i.e. Friedlander and Martinez, 1994) provide tools to address the seismic survey design problem. Compressive sensing provides for extracting (or 'reconstructing') a uniformly sampled wave-field from non-uniformly sampled sensors, and convex optimization provides computationally viable solutions for Np-complete problems. For these methods, a sparse representation of the seismic wave-field must exist in some domain. Algorithms that exploit the sparsity of seismic wave-fields make the adoption of Compressive Sensing (CS) concepts a natural fit to geophysics.

In recent years, random sampling has been proposed as a means for extracting more bandwidth from seismic data than Nyquist sampling would predict (Herrman, 2010, Moldoveanu, 2010, Milton, et. al., 2012). Use of non-uniform sampling for improving signal bandwidth has a long history, having been used in many imaging fields such as signal processing (Shapiro and Silverman, 1960), beamforming (Griffiths and Jim, 1982), synthetic aperture radar (Munson and Sanz, 1984) and seismic imaging (Mosher and Mason, 1985). Non-uniform sampling requires more precise knowledge of sensor positions than is normally required for uniform sampling. The advent of the Global Positioning System (GPS) in combination with advancements in compressive sensing, optimization, and high performance computing makes this NUOS technology practical.

With NUOS, an optimization loop is used to determine the locations of sources and receivers for a non-uniform design, rather than relying solely on decimation, jittering, or randomization. Construction of the optimization loop requires a cost function that determines the viability of a given survey design, and an algorithm for searching the very large space of possible solutions. The cost function can take many forms, ranging from conventional array response to more sophisticated matrix analysis techniques (i.e. diagonal dominance, condition number, eigenvalue ranking, mutual coherence, etc). Practical implementations of NUOS can exploit knowledge of the underlying earth model if known, rather than a model independent compressive sensing implementation.

A cost function is a geophysical attribute of the survey to be optimized. At the simplest level may be just the fold, (number of hits (traces) in a particular bin) or the offsets (a hit in a particular unique offset plane in a bin) or the azimuth distribution (hits in a particular bin coming from a particular direction) are all things to be optimized and keep relatively uniform for the best interpretation. More complex costs functions may include 5D interpolation (x, y, z, time, distribution), or optimize for better offset vector tile (distributions in the offset vector space per bin per fold tile), or more for interpretation, i.e., optimize for a near trace gradient stack (used for AVO and rock property detection) where each bin could have at least 1 hit per every 200 m offset from 0 to 800 m offset. These nonlimiting examples of costs functions may be either dictated by acquisition theory (fold, offsets and azimuths) processing (5D interpolation, offset vector tile distribution) or interpretation (gradient stack for AVO).

A convenient choice for constructing a cost function is to use a reconstruction algorithm that can produce uniformly sampled data from a set of non-uniform sample locations. Example algorithms range from simple linear or nearest neighbour interpolation to more sophisticated reconstruction techniques such as MWNI (Liu and Sacchi, 2004), and compressive sensing based reconstruction techniques (Hennefent and Herrmann, 2008, Herrmann, 2010). The cost function can be derived independently of the data by matrix analysis, or it can be a combined with prior knowledge of the underlying earth model if available.

In one nonlimiting implementation, a compressive sensing algorithm for data reconstruction (e.g., Herrmann, 2010) may be used for calculation of the cost function. This algorithm uses a sampling matrix that extracts a subset of the data from an underlying uniformly sampled grid. A compressive sensing algorithm is then used to reconstruct the data on the underlying grid. The signal-to-noise ratio of the reconstructed data is used as the cost function for the outer NUOS optimization loop. The signal-to-noise ratio may be approximated by constructing elastic synthetic seismograms from a detailed model of the study area. Synthetic records may be calculated for very dense spatial sampling, and then decimated according to a particular realization of the non-uniform sampling matrix. The signal-to-noise ratio for a particular realization may be defined as the root-mean-square of the reconstructed data minus the original synthetic data over a window corresponding to an area of interest.

Selection of an optimal design based on evaluations of the cost function and associated constraints can be cast as a classic optimization problem, for which a wide range of potential solutions is available. A Monte-Carlo optimization scheme may be used to select the source locations for the field trial.

As an example of contrasting a convention acquisition design with a NUOS design, a conventional uniform survey may be acquired with a fixed spread of 580 receivers spaced at 25 meters, and with a source spacing of 25 meters over the same aperture as the receiver spread. A normal moveout processing application with a velocity function designed for minimizing aliasing between near and far offsets applied to the data will likely nevertheless produce the result that significant aliasing will occur between 30 and 60 Hz.

In contrast, a NUOS design may use an underlying sampling matrix with 6.25 meter spacing and the number of shots identical to that used in the uniform design and covering the same spatial aperture. Several hundred Monte Carlo iterations may be used to select optimal source locations for these parameters. The selection criteria used may be based on the signal-to-noise ratio of data reconstructed from elastic wave synthetic seismograms using a detailed velocity model from the study area. Reconstructed receiver gathers using the NUOS criteria and compressive sensing algorithm produce seismic records largely free of aliasing artifacts.

Non-Uniform Optimal Sampling (NUOS) provides a methodology for choosing non-uniform sensor locations for seismic survey planning. This technique uses compressive sensing along with optimization algorithms to identify sensor layouts that satisfy optimization constraints for a particular survey. Field trials conducted using NUOS concepts confirms the viability of using compressive sensing algorithms to recover significantly broader spatial bandwidth from non-uniform sampling than could be obtained using uniform sampling. In the 2D field example discussed above, data with spatial bandwidth equivalent to 12.5 m uniform sampling was obtained using the same number of samples as would be used for 25 m survey, or one-half the effort of a conventional 2D survey. This demonstrates that using NUOS methodology for a given number of sources and receivers improvements over convention acquisition may be expected that reduce the cost of survey for a fixed area, to cover a larger area with the same amount of equipment, or to increase the resolution over a given area.

Figure 15:
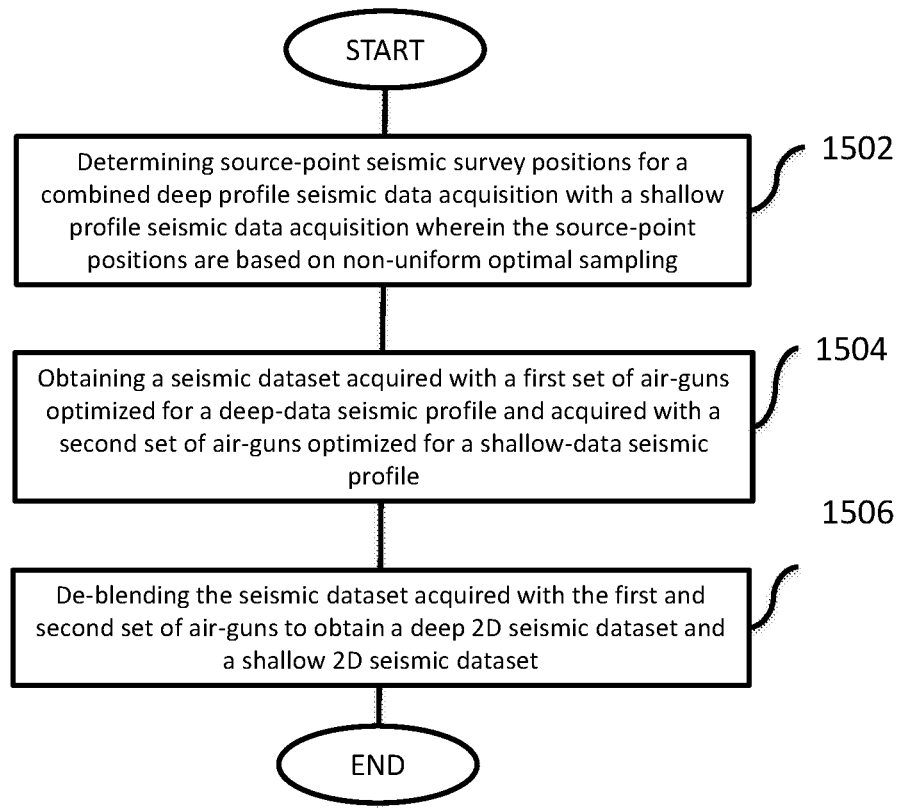
FIG. 15 illustrates a flow chart as described in Example 4.

One nonlimiting implementation is shown in FIG. 15, a method for 2D seismic data acquisition, so that simultaneously acquired deep profile data and shallow profile data may be acquired with one traverse of a survey area with the acquisition equipment. The method comprises determining source-point seismic survey positions for a combined deep profile seismic data acquisition with a shallow profile seismic data acquisition wherein the source-point positions are based on non-uniform optimal sampling 1502. A seismic dataset is obtained where the data were acquired with a first set of air-guns optimized for a deep-data seismic profile and acquired with a second set of air-guns optimized for a shallow-data seismic profile 1504. The seismic dataset acquired with the first and second set of air-guns is de-blended to obtain a deep 2D seismic dataset and a shallow 2D seismic dataset 1506. In one implementation the first set of air-guns has a first encoded source signature and the second set of air-guns has a second encoded source signature, which may facilitate the de-blending process.

Another nonlimiting implementation comprises using interpolated compressive sensing to reconstruct the acquired dataset to a nominal grid. A compressive sensing application takes the originally acquired sparse data from an underlying acquisition position, data which may be acquired on a regular or irregular underlying grid, and moves reconstructed data to a nominal grid, which may be a uniformly sampled grid. After the data are reconstructed using interpolated compressive sensing, the data may be used to obtain shot-point or source-point gathers (or common source gathers), receiver gathers (or common detector gathers), common offset gathers or common midpoint gathers. Each of these types of gathers may have beneficial utility in different aspects when the combined deep-shallow simultaneously acquired dataset is deblended into a deep profile dataset and shallow profile dataset. De-blending may be accomplished as disclosed by Mandad et al., 2011, which is expressly incorporated herein by reference.

In still another nonlimiting implementation, a non-uniform optimal sampling method further comprises using a Monte Carlo Optimization scheme to determine source-point seismic survey positions. Determining the non-uniform optimal sampling using a Monte Carlo Optimization scheme may further comprise a Signal-to-Noise Ratio cost-function (SNR cost-function) defined as the root-mean-square SNR of the data to be reconstructed minus the SNR of an elastic wave synthetic dataset over an area of interest using an appropriate velocity model. This is a way of exploiting a priori knowledge of the underlying earth model to provide for favorable conditions for sparse recovery that may improve the wavefield sampling operator, rather than relying on randomness or some other non-model related parameter.

Additionally, using a Monte Carlo Optimization scheme for determining the non-uniform optimal sampling may comprise using cost-function to determine the optimized locations, the cost function may be diagonal dominance, a conventional array response, a condition number, eigenvalue determination, mutual coherence, trace fold, or azimuth distribution.

Figure 16:
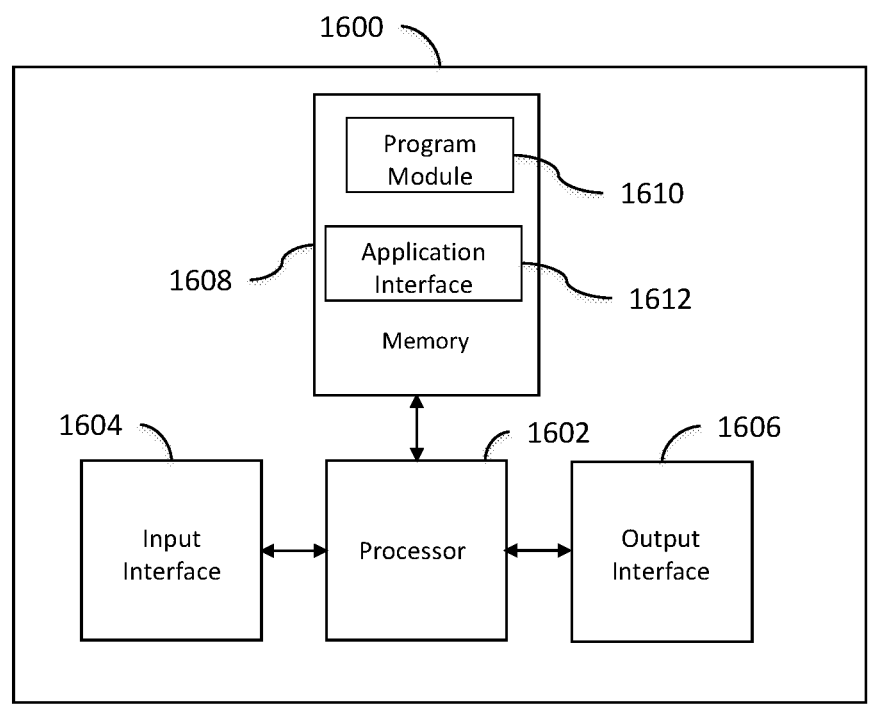
FIG. 16 illustrates a schematic diagram of an implementation of a system according to various implementations of the present disclosure.

Implementations disclosed herein may be used in conjunction with system 1600 as illustrated in FIG. 16. FIG. 16 illustrates a schematic diagram of an implementation of a system 1600 that may correspond to or may be part of a computer and/or any other computing device, such as a workstation, server, mainframe, super computer, processing graph and/or database wherein NUOS technology may be applied. The system 1600 includes a processor 1602, which may be also be referenced as a central processor unit (CPU). The processor 1602 may communicate and/or provide instructions to other components within the system 1600, such as the input interface 1604, output interface 1606, and/or memory 1608. In one implementation, the processor 1602 may include one or more multi-core processors and/or memory (e.g., cache memory) that function as buffers and/or storage for data. In alternative implementations, processor 1602 may be part of one or more other processing components, such as application specific integrated circuits (ASICs), field-programmable gate arrays (FPGAs), and/or digital signal processors (DSPs). Although FIG. 16 illustrates that processor 1602 may be a single processor, it will be understood that processor 802 is not so limited and instead may represent a plurality of processors including massively parallel implementations and processing graphs comprising mathematical operators connected by data streams distributed across multiple platforms, including cloud-based resources. The processor 1602 may be configured to implement any of the methods described herein.

FIG. 16 illustrates that memory 1608 may be operatively coupled to processor 1602. Memory 1608 may be a non-transitory medium configured to store various types of data. For example, memory 1608 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions.

As shown in FIG. 16, the memory 1608 may be used to house the instructions for carrying out various implementations described herein. In an implementation, the memory 1608 may comprise a computer program module 1610, which may embody a computer program product, which may be accessed and implemented by processor 1602. Computer program module 1610 may be, for example, programs to implement NUOS and compressive sensing technology. Alternatively, application interface 1612 may be stored and accessed within memory by processor 1602. Specifically, the program module or application interface may perform signal processing and/or conditioning and applying non-uniform optimal sampling and compressive sensing as described herein.

Programming and/or loading executable instructions onto memory 1608 and processor 1602 in order to transform the system 1600 into a particular machine or apparatus that operates on time series data is well known in the art. Implementing instructions, real-time monitoring, and other functions by loading executable software into a computer can be converted to a hardware implementation by well-known design rules. For example, decisions between implementing a concept in software versus hardware may depend on a number of design choices that include stability of the design and numbers of units to be produced and issues involved in translating from the software domain to the hardware domain. Often a design may be developed and tested in a software form and subsequently transformed, by well-known design rules, to an equivalent hardware implementation in an ASIC or application specific hardware that hardwires the instructions of the software. In the same manner as a machine controlled by a new ASIC is a particular machine or apparatus, likewise a computer that has been programmed and/or loaded with executable instructions may be viewed as a particular machine or apparatus.

In addition, FIG. 16 illustrates that the processor 1602 may be operatively coupled to an input interface 1604 configured to obtain data and output interface 1606 configured to output and/or display the results or pass the results to other processing. The input interface 1604 may be configured to obtain time series and compressive sensing data via sensors, cables, connectors, and/or communication protocols. In one implementation, the input interface 1604 may be a network interface that comprises a plurality of ports configured to receive and/or transmit NUOS technology data via a network. In particular, the network may transmit the data via wired links, wireless link, and/or logical links. Other examples of the input interface 1604 may be universal serial bus (USB) interfaces, CD-ROMs, DVD-ROMs. The output interface 1606 may include, but is not limited to one or more connections for a graphic display (e.g., monitors) and/or a printing device that produces hard-copies of the generated results.

CONCLUSIONS

The seismic data acquisition design problem was considered from the point of view of compressive sensing seismic data reconstruction and non-uniform optimal sampling. In particular, mutual coherence and a greedy optimization algorithm was utilized to design an optimal acquisition grid. With the synthetic example, the signal-to-noise ratio and the mutual coherence are anti-correlated. Additionally, the synthetic example showed that the randomized greedy algorithm gave a mutual coherence that is lower than that found from a Monte Carlo simulation. Further, the signal-to-noise ratio of the reconstruction result produced from the optimal grid found through the greedy algorithm is similar to that found from the Monte Carlo simulation, which can be predicted from the work of Hennenfent and Herrmann (2008). Finally, the choice of mutual coherence proxy using a real data example was validated, and where a qualitative analysis of the reconstruction results was made, comparing a low mutual coherence sampling grid and a high mutual coherence sampling grid of the same survey area.

Although the systems and processes described herein have been described in detail, it should be understood that various changes, substitutions, and alterations can be made without departing from the spirit and scope of the technology as defined by the following claims. Those skilled in the art may be able to study the preferred implementations and identify other ways to practice the technology that are not exactly as described herein. It is the intent of the inventors that variations and equivalents of the technology are within the scope of the claims while the description, abstract and drawings are not to be used to limit the scope of the technology. The technology is specifically intended to be as broad as the claims below and their equivalents.

REFERENCES

All of the references cited herein are expressly incorporated by reference. The discussion of any reference is not an admission that it is prior art to the present technology, especially any reference that may have a publication data after the priority date of this application. Incorporated references are listed again here for convenience:

1. US20150124560 A1 (Chingbo, Kaplan, Mosher, Brewer and Keys); "Compressive Sensing" (2015).
2. Mandad, A., et al., "Separation of blended data by iterative estimation and subtraction of blending interference noise," Geophysics, v. 76, no. 3, P. Q9-Q17 (2011).
3. Herrmann, F., "Randomized sampling and sparsity: Getting more information from fewer samples," Geophysics, v. 75, no. 6, P. WB173-WB187 (2010).
4. Mosher, C., et al., "Non-uniform optimal sampling for seismic survey design," 74$^{th}$ Conference and Exhibition, EAGE, Extended Abstracts, X034 (2012)
5. Mosher, C., et al., "Compressive Seismic Imaging," DOI Http://dx.doi.org/10.11901segam2012-1460.1 (2012).
6. Baraniuk, R., "Compressive Sensing," IEEE Sig. Proc. Mag., V. 24, No. 4, P. 118-124 (2007).
7. Hennenfent, G., et al., "Simply denoise: wavefield reconstruction via jittered undersampling," Geophysics, V. 73, no. 3, P. V19-V28 (2008).
8. Liu, B., et al., and Sacchi, M. "Minimum weighted norm interpolation of seismic records," Geophysics, 69(6), 1560-1568 (2004).
9. Moldoveanu, N. "Random Sampling: A New Strategy for Marine Acquisition," SEG Expanded Abstracts 29, 51-55 (2010).
10. Mosher, C., and Mason, I. "An in-situ analysis of 3-D seismic lateral resolution," SEG Expanded Abstracts 4, 109-111 (1985).
11. Sacchi, M. "A Tour of High Resolution Transforms," CSEG, Expanded Abstracts, 665-668 (2009).
12. Maurer, H., Curtis, A., and Boerner, D. "Seismic Data Acquisition," Geophysics Today, SEG Press Book (2010).
13. Meunier, J. "Seismic Acquisition from Yesterday to Tomorrow," SEG/EAGE Distinguished Instructor Series, No. 14 (2011).
14. Shapiro, H., et al., "Alias-free sampling of random noise," SIAM Journal on Applied Mathematics, 8(2), 225-248 (1960).
15. Milton, A., Trickett, S., and Burroughs, L. "Reducing acquisition costs with random sampling and multidimensional interpolation," SEG Expanded Abstracts 30, 52-56 (2011).

What is claimed is:

1. A method for seismic imaging, the method comprising:
    obtaining a combined seismic dataset including shallow profile seismic data and deep profile seismic data, the shallow profile seismic data being acquired using acquisition equipment during a traverse of a survey area, the deep profile seismic data being acquired simultaneously with the shallow profile seismic data during the traverse of the survey area, the acquisition equipment including a plurality of seismic sources having a plurality of positions relative to the survey area, the plurality of positions of the plurality of seismic sources being non-uniform and non-random; and generating a two-dimensional (2D) deep seismic dataset and a 2D shallow seismic dataset by de-blending the combined seismic dataset.

2. The method of claim 1, further comprising:
reconstructing the combined seismic dataset to a nominal grid using interpolated compressive sensing.

3. The method of claim 2, further comprising:
obtaining at least one of source-point gathers, common source gathers, receiver gathers, common detector gathers, common offset gathers, or common midpoint gathers following reconstruction of the combined seismic dataset.

4. The method of claim 2, wherein reconstructing the combined seismic dataset comprises implementing an analysis-based recovery including alternative direction method (ADM) and a variable splitting technique.

5. The method of claim 1, wherein the plurality of seismic sources includes a first set of seismic sources and a second set of seismic sources, the first set of seismic sources optimized for the shallow profile seismic data and the second set of seismic sources optimized for the deep profile seismic data.

6. The method of claim 5, wherein the first set of seismic sources has a first encoded source signature and the second set of seismic sources has a second encoded source signature that is different from the first encoded source signature.

7. The method of claim 1, wherein the plurality of positions of the plurality of seismic sources are determined using an optimization loop constructed using a cost function.

8. The method of claim 7, wherein the cost function includes at least one of diagonal dominance, a conventional array response, a condition number, eigenvalue determination, mutual coherence, trace fold, or azimuth distribution.

9. The method of claim 7, wherein the cost function is a Signal-to-Noise Ratio cost-function.

10. The method of claim 1, wherein a towed streamer includes the plurality of seismic sources.

11. One or more tangible non-transitory computer-readable storage media storing computer-executable instructions for performing a computer process on a computing system, the computer process comprising:
obtaining a combined seismic dataset including shallow profile seismic data and deep profile seismic data, the shallow profile seismic data being acquired using acquisition equipment during a traverse of a survey area, the deep profile seismic data being acquired simultaneously with the shallow profile seismic data during the traverse of the survey area, the acquisition equipment including a plurality of seismic sources having a plurality of positions relative to the survey area, the plurality of positions of the plurality of seismic sources being non-uniform and non-random; and generating a two-dimensional (2D) deep seismic dataset and a 2D shallow seismic dataset by de-blending the combined seismic dataset.

12. The one or more tangible non-transitory computer-readable storage media of claim 11, the computer process further comprising:
reconstructing the combined seismic dataset to a nominal grid using interpolated compressive sensing.

13. The one or more tangible non-transitory computer-readable storage media of claim 12, the computer process further comprising:
obtaining at least one of source-point gathers, common source gathers, receiver gathers, common detector gathers, common offset gathers, or common midpoint gathers following reconstruction of the combined seismic dataset.

14. The one or more tangible non-transitory computer-readable storage media of claim 12, wherein reconstructing the combined seismic dataset comprises implementing an analysis-based recovery including alternative direction method (ADM) and a variable splitting technique.

15. The one or more tangible non-transitory computer-readable storage media of claim 11, wherein the plurality of seismic sources includes a first set of seismic sources and a second set of seismic sources, the first set of seismic sources optimized for the shallow profile seismic data and the second set of seismic sources optimized for the deep profile seismic data.

16. The one or more tangible non-transitory computer-readable storage media of claim 15, wherein the first set of seismic sources has a first encoded source signature and the second set of seismic sources has a second encoded source signature that is different from the first encoded source signature.

17. The one or more tangible non-transitory computer-readable storage media of claim 11, wherein the plurality of positions of the plurality of seismic sources are determined using an optimization loop constructed using a cost function.

18. The one or more tangible non-transitory computer-readable storage media of claim 17, wherein the cost function includes at least one of diagonal dominance, a conventional array response, a condition number, eigenvalue determination, mutual coherence, trace fold, or azimuth distribution.

19. The one or more tangible non-transitory computer-readable storage media of claim 17, wherein the cost function is a Signal-to-Noise Ratio cost-function.

20. The one or more tangible non-transitory computer-readable storage media of claim 11, wherein a towed streamer includes the plurality of seismic sources.

\* \* \* \* \*